US012289789B2

United States Patent
Peng et al.

(10) Patent No.: US 12,289,789 B2
(45) Date of Patent: Apr. 29, 2025

(54) COMMUNICATION METHOD AND APPARATUS

(71) Applicant: HUAWEI TECHNOLOGIES CO., LTD., Shenzhen (CN)

(72) Inventors: Wenjie Peng, Shanghai (CN); Xudong Yang, Shanghai (CN); Xingxing Hu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 350 days.

(21) Appl. No.: 17/879,037

(22) Filed: Aug. 2, 2022

(65) Prior Publication Data
US 2022/0377834 A1 Nov. 24, 2022

Related U.S. Application Data

(63) Continuation of application No. PCT/CN2020/074237, filed on Feb. 3, 2020.

(51) Int. Cl.
*H04W 76/28* (2018.01)
*H04L 1/00* (2006.01)
*H04W 24/10* (2009.01)
*H04W 52/36* (2009.01)

(52) U.S. Cl.
CPC ........... *H04W 76/28* (2018.02); *H04L 1/0038* (2013.01); *H04W 24/10* (2013.01); *H04W 52/365* (2013.01)

(58) Field of Classification Search
CPC .... H04W 76/28; H04W 24/10; H04W 52/365
See application file for complete search history.

(56) References Cited

U.S. PATENT DOCUMENTS 9,736,883 B2 * 8/2017 Guo .................. H04W 76/15
11,071,111 B2 * 7/2021 Kim ..................... H04W 72/21
(Continued)

FOREIGN PATENT DOCUMENTS

CN 105589506 A 5/2016
CN 109548095 A 3/2019
(Continued)

OTHER PUBLICATIONS

Title: Discussion on F1AP IEs for MR-DC coordination; Source: CATT; Date: Oct. 12-Oct. 16, 2018, pp. 1-3 (Year: 2018).*
CATT: "Discussion on F1AP IEs for MR-DC coordination",3GPP Draft; R3-186556,Nov. 11, 2018, XP051558336, total 3 pages.
RAN3: "[Draft LSon MR-DC low layer coordination",3GPP Draft; R3-192373,May 13, 2019, XP051731659, total 1 pages.
(Continued)

*Primary Examiner* — Fahmida S Chowdhury
(74) *Attorney, Agent, or Firm* — HAUPTMAN HAM, LLP

(57) ABSTRACT

This application provides a communication method and apparatus, and relate to the communication field, so that an inter-node negotiation process between an MN and an SN can be completed when the MN uses a CU-DU architecture in DC communication. The method includes: A DU receives a first request message from a CU, where the first request message requests the DU to determine configuration information of an MN, and the configuration information of the MN is used to assist an SN in determining configuration information used for a terminal device; and the DU sends a first response message to the CU, where the first response message includes the configuration information of the MN. Embodiments of this application are applied to a DC scenario.

20 Claims, 9 Drawing Sheets

(56) References Cited

U.S. PATENT DOCUMENTS

| | | | |
|---|---|---|---|
| 2014/0211759 A1* | 7/2014 | Guo | H04W 76/34 |
| | | | 370/331 |
| 2015/0327269 A1* | 11/2015 | Kim | H04W 8/24 |
| | | | 370/329 |
| 2016/0014691 A1* | 1/2016 | Rastogi | H04W 52/0209 |
| | | | 370/311 |
| 2017/0171768 A1* | 6/2017 | Kim | H04L 5/001 |
| 2017/0257792 A1* | 9/2017 | Kim | H04W 74/0833 |
| 2019/0124690 A1* | 4/2019 | Siomina | H04W 24/10 |
| 2019/0173634 A1* | 6/2019 | Teyeb | H04W 24/10 |
| 2019/0174342 A1 | 6/2019 | Yokoyama et al. | |
| 2019/0253937 A1 | 8/2019 | Hsieh | |
| 2020/0275526 A1* | 8/2020 | Sharma | H04L 5/0051 |
| 2021/0105671 A1* | 4/2021 | Van Der Velde | H04W 36/185 |
| 2021/0235527 A1* | 7/2021 | Uchino | H04W 52/365 |
| 2022/0053593 A1* | 2/2022 | Wang | H04W 52/0277 |
| 2022/0377834 A1* | 11/2022 | Peng | H04W 76/28 |

FOREIGN PATENT DOCUMENTS

| | | |
|---|---|---|
| CN | 109788517 A | 5/2019 |
| CN | 109995553 A | 7/2019 |
| CN | 110166273 A | 8/2019 |

OTHER PUBLICATIONS

CATT: "Discussion on inter-node RRC container", 3GPP Draft; R3-174534,Nov. 17, 2017,XP051373145, total 7 pages.
Extended European Search Report issued in corresponding European Application No. 20917727.8, dated Dec. 5, 2022, pp. 1-8.
Chinese Office Action issued in corresponding Chinese Application No. 202080094857.8, dated Jun. 8, 2024, pp. 1-8.
International Search Report issued in corresponding International Application No. PCT/CN2020/074237, dated Oct. 27, 2020, pp. 1-10.

* cited by examiner

COMMUNICATION METHOD AND APPARATUS

CROSS-REFERENCE TO RELATED APPLICATIONS

This application is a continuation of International Patent Application No. PCT/CN2020/074237, filed on Feb. 3, 2020. The disclosure of the aforementioned application is hereby incorporated by reference in its entirety.

TECHNICAL FIELD

This application relates to the communication field, and in particular, to a communication method and apparatus.

BACKGROUND

To improve a data transmission throughput, a dual connectivity (dual connectivity, DC) technology is introduced into a communication system. In DC communication, both a master node (master node, MN) and a secondary node (secondary node, SN) need to keep connected to a terminal device. To prevent a joint configuration of the MN and the SN from exceeding a capability of the terminal device, the MN and the SN need to perform inter-node negotiation before generating configurations for the terminal device.

To reduce deployment costs of an access network device, a base station may use a centralized unit (centralized unit, CU)-distributed unit (distributed unit, DU) architecture, and a CU and a DU may be divided based on protocol layers of a wireless network. For example, functions of a higher protocol layer such as radio resource control (radio resource control, RRC) and a packet data convergence protocol (packet data convergence protocol, PDCP) may be set on the CU, and functions of a lower protocol layer such as radio link control (radio link control, RLC) and medium access control (medium access control, MAC) may be set on the DU.

However, in DC communication, if the MN uses a CU-DU architecture, currently there is no corresponding solution for how to complete an inter-node negotiation process between the MN and the SN.

SUMMARY

Embodiments of this application provide a communication method and apparatus, so that an inter-node negotiation process between an MN and an SN can be completed when the MN uses a CU-DU architecture in DC communication.

According to a first aspect, an embodiment of this application provides a communication method, including: A DU receives a first request message from a CU, where the first request message is used to request the DU to determine configuration information of an MN, and the configuration information of the MN is used to assist an SN in determining configuration information used for a terminal device; and the DU sends a first response message to the CU, where the first response message includes the configuration information of the MN.

Based on the method provided in this embodiment of this application, when the MN uses a CU-DU architecture, after receiving the first request message from the CU, the DU may determine the configuration information (namely, lower layer configuration information in an inter-node message) of the MN, and send the configuration information of the MN to the SN through the CU, to complete an inter-node negotiation process between the MN and the SN. That is, the MN and the SN negotiate a capability of the terminal device based on corresponding configuration information, to implement DC configuration on the terminal device.

In a possible design, the configuration information of the MN includes one or more of the following information: a long discontinuous reception (discontinuous reception, DRX) cycle start offset, a DRX slot offset, power headroom configuration information, information about a band combination (band combination, BC) that is of the terminal device and allowed by the MN, feature set (feature set, FS) information corresponding to the information about the BC that is of the terminal device and allowed by the MN, band information, a maximum reference quantity of physical downlink control channel (physical downlink control channel, PDCCH) blind detections that is allowed to be configured by the SN, measurement gap configuration information, a measurement gap configuration purpose, or high-frequency measurement gap configuration information.

In a possible design, the first request message includes indication information, and the indication information is used to indicate the DU to determine the configuration information of the MN.

In a possible design, the first request message is a first context modification request message for the terminal device or a first context setup request message for the terminal device.

In a possible design, the first request message includes the information about the BC that is of the terminal device and allowed by the MN. In other words, the information about the BC that is of the terminal device and allowed by the MN may be determined by the CU.

In a possible design, the first request message further includes the band information.

In a possible design, the method further includes: The DU determines, based on the information about the BC of the terminal device, the FS information corresponding to the information about the BC of the terminal device.

In a possible design, the method further includes: The DU receives a second request message from the CU, where the second request message includes configuration information determined by the SN and used to perform inter-node negotiation with the MN; and the DU sends, to the CU, a second response message in response to the second request message.

In a possible design, the configuration information used to perform inter-node negotiation with the MN includes one or more of the following information: information about a BC selected by the SN, FS information corresponding to the information about the BC selected by the SN, a long DRX cycle start offset of the SN, a DRX slot offset of the SN, or power headroom configuration information of the SN.

In a possible design, the second request message further includes configuration information requested by the SN and used to perform inter-node negotiation between the SN and the MN, and the method further includes: The DU determines, based on the configuration information requested by the SN and used to perform inter-node negotiation between the SN and the MN, configuration information allowed by the DU and used to perform inter-node negotiation between the SN and the MN, where the second response message includes the configuration information allowed by the DU and used to perform inter-node negotiation between the SN and the MN.

In a possible design, the configuration information requested by the SN and used to perform inter-node negotiation between the SN and the MN includes one or more of the following information: information about a BC requested by the SN, FS information corresponding to the information about the BC requested by the SN, a quantity of PDCCH blind detections that is requested by the SN, or information for the SN to request to configure a measurement gap.

According to a second aspect, an embodiment of this application provides a communication method, including: A DU receives a request message from a CU, where the request message includes configuration information determined by an SN and used to perform inter-node negotiation with an MN and/or configuration information requested by the SN and used to perform inter-node negotiation between the SN and the MN; and the DU sends, to the CU, a response message in response to the request message.

Based on the method provided in this embodiment of this application, the DU may receive, from the CU, lower layer configuration information such as the configuration information determined by the SN and used to perform inter-node negotiation with the MN and/or the configuration information requested by the SN and used to perform inter-node negotiation between the SN and the MN. In addition, the DU may respond to the lower layer configuration information, and notify the SN of a corresponding response result through the CU, to complete an inter-node negotiation process between the MN and the SN. This ensures that a secondary station modification procedure triggered by the SN is successfully completed.

In a possible design, the configuration information determined by the SN and used to perform inter-node negotiation with the MN includes one or more of the following information: information about a BC selected by the SN, FS information corresponding to the information about the BC selected by the SN, a long DRX cycle start offset of the SN, a DRX slot offset of the SN, or power headroom configuration information of the SN.

In a possible design, the configuration information requested by the SN and used to perform inter-node negotiation between the SN and the MN includes one or more of the following information: information about a BC requested by the SN, FS information corresponding to the information about the BC requested by the SN, a quantity of PDCCH blind detections that is requested by the SN, or information for the SN to request to configure a measurement gap.

In a possible design, when the request message includes the configuration information requested by the SN and used to perform inter-node negotiation between the SN and the MN, the method further includes: The DU determines, based on the configuration information requested by the SN and used to perform inter-node negotiation between the SN and the MN, configuration information allowed by the DU and used to perform inter-node negotiation between the SN and the MN, where the response message includes the configuration information allowed by the DU and used to perform inter-node negotiation between the SN and the MN.

In a possible design, when the request message includes the configuration information determined by the SN and used to perform inter-node negotiation with the MN, the response message is used to confirm that the DU has received the configuration information determined by the SN and used to perform inter-node negotiation with the MN.

According to a third aspect, an embodiment of this application provides a communication method, including: A CU sends a first request message to a DU, where the first request message is used to request the DU to determine configuration information of an MN, and the configuration information of the MN is used to assist an SN in determining configuration information used for a terminal device; the CU receives a first response message from the DU, where the first response message includes the configuration information of the MN; and the CU sends the configuration information of the MN to the SN.

Based on the method provided in this embodiment of this application, when the MN uses a CU-DU architecture, the CU may send the first request message to the DU, to request the DU to generate the configuration information (namely, lower layer configuration information in an inter-node message) of the MN. The configuration information of the MN is used to assist the SN in generating the configuration information used for the terminal device in a DC scenario. In this way, the CU can obtain the lower layer configuration information in the inter-node message from the DU, and send the lower layer configuration information to the SN, to complete an inter-node negotiation process between the MN and the SN. That is, the MN and the SN negotiate a capability of the terminal device based on corresponding configuration information, to implement DC configuration on the terminal device.

In a possible design, the configuration information of the MN includes one or more of the following information: a long DRX cycle start offset, a DRX slot offset, power headroom configuration information, information about a BC that is of the terminal device and allowed by the MN, FS information corresponding to the information about the BC that is of the terminal device and allowed by the MN, band information, a maximum reference quantity of PDCCH blind detections that is allowed to be configured by the SN, measurement gapconfiguration information, a measurement gap configuration purpose, or high-frequency measurement gap configuration information.

In a possible design, the first request message includes indication information, and the indication information is used to indicate the DU to determine the configuration information of the MN.

In a possible design, the first request message is a first context modification request message for the terminal device or a first context setup request message for the terminal device.

In a possible design, the first request message includes the information about the BC that is of the terminal device and allowed by the MN.

In a possible design, the first request message further includes the band information.

In a possible design, the method further includes: The CU sends a second request message to the DU, where the second request message includes configuration information determined by the SN and used to perform inter-node negotiation with the MN; and the CU receives, from the DU, a second response message in response to the second request message.

In a possible design, the configuration information used to perform inter-node negotiation with the MN includes one or more of the following information: information about a BC selected by the SN, FS information corresponding to the information about the BC selected by the SN, a long DRX cycle start offset of the SN, a DRX slot offset of the SN, or power headroom configuration information of the SN.

In a possible design, the second request message further includes configuration information requested by the SN and used to perform inter-node negotiation between the SN and the MN, and the method further includes: The DU determines, based on the configuration information requested by the SN and used to perform inter-node negotiation between the SN and the MN, configuration information allowed by the DU and used to perform inter-node negotiation between the SN and the MN, where the second response message includes the configuration information allowed by the DU and used to perform inter-node negotiation between the SN and the MN.

In a possible design, the configuration information requested by the SN and used to perform inter-node negotiation between the SN and the MN includes one or more of the following information: information about a BC requested by the SN, FS information corresponding to the information about the BC requested by the SN, a quantity of PDCCH blind detections that is requested by the SN, or information for the SN to request to configure a measurement gap.

In a possible design, the method further includes: The CU determines power control mode indication information, where the power control mode indication information is used to negotiate a mode of sharing a power of the terminal device by the MN and the SN; and the CU sends the power control mode indication information to the SN.

According to a fourth aspect, an embodiment of this application provides a communication method, including: A CU receives, from an SN, configuration information determined by the SN and used to perform inter-node negotiation with an MN and/or configuration information requested by the SN and used to perform inter-node negotiation between the SN and the MN; the CU sends a request message to a DU, where the request message includes the configuration information determined by the SN and used to perform inter-node negotiation with the MN and/or the configuration information requested by the SN and used to perform inter-node negotiation between the SN and the MN; and the CU receives, from the DU, a response message in response to the request message.

Based on the method provided in this embodiment of this application, after the CU receives, from the SN, lower layer configuration information such as the configuration information determined by the SN and used to perform inter-node negotiation with the MN and/or the configuration information requested by the SN and used to perform inter-node negotiation between the SN and the MN, the CU may send the lower layer configuration information to the DU by using the request message. The DU may respond to the lower layer configuration information, and then the CU notifies the SN of a corresponding response result, to complete an inter-node negotiation process between the MN and the SN. This ensures that a secondary station modification procedure triggered by the SN is successfully completed.

In a possible design, the configuration information determined by the SN and used to perform inter-node negotiation with the MN includes one or more of the following information: information about a BC selected by the SN, FS information corresponding to the information about the BC selected by the SN, a long DRX cycle start offset of the SN, a DRX slot offset of the SN, or power headroom configuration information of the SN.

In a possible design, the configuration information requested by the SN and used to perform inter-node negotiation between the SN and the MN includes one or more of the following information: information about a BC requested by the SN, FS information corresponding to the information about the BC requested by the SN, a quantity of PDCCH blind detections that is requested by the SN, or information for the SN to request to configure a measurement gap.

In a possible design, when the request message includes the configuration information requested by the SN and used to perform inter-node negotiation between the SN and the MN, the response message includes configuration information allowed by the DU and used to perform inter-node negotiation between the SN and the MN.

In a possible design, when the request message includes the configuration information determined by the SN and used to perform inter-node negotiation with the MN, the response message is used to confirm that the DU has received the configuration information determined by the SN and used to perform inter-node negotiation with the MN.

According to a fifth aspect, an embodiment of this application provides a communication method, including: An SN receives power control mode indication information from an MN, where the power control mode indication information is used to negotiate a mode of sharing a power of a terminal device by the MN and the SN. In this way, the MN and the SN may negotiate, based on the power control mode indication information, the mode of sharing a power of the terminal device.

In a possible design, that an SN receives power control mode indication information from a CU includes: A CU of the SN receives the power control mode indication information from the MN; and the CU of the SN sends the power control mode indication information to a DU of the SN.

According to a sixth aspect, an embodiment of this application provides a communication apparatus. The communication apparatus may be a DU, and includes: a receiving unit, configured to receive a first request message from a CU, where the first request message is used to request the DU to determine configuration information of an MN, and the configuration information of the MN is used to assist an SN in determining configuration information used for a terminal device; and a sending unit, configured to send a first response message to the CU, where the first response message includes the configuration information of the MN.

In a possible design, the apparatus further includes a processing unit, configured to determine, based on information about a BC of the terminal device, FS information corresponding to the information about the BC of the terminal device.

In a possible design, the receiving unit is further configured to receive a second request message from the CU, where the second request message includes configuration information determined by the SN and used to perform inter-node negotiation with the MN. The sending unit is further configured to send a second response message in response to the second request message.

In a possible design, the second request message further includes configuration information requested by the SN and used to perform inter-node negotiation between the SN and the MN. The processing unit is further configured to determine, based on the configuration information requested by the SN and used to perform inter-node negotiation between the SN and the MN, configuration information allowed by the DU and used to perform inter-node negotiation between the SN and the MN, where the second response message includes the configuration information allowed by the DU and used to perform inter-node negotiation between the SN and the MN.

According to a seventh aspect, an embodiment of this application provides a communication apparatus. The communication apparatus may be a CU, and includes: a sending unit, configured to send a first request message to a DU, where the first request message is used to request the DU to determine configuration information of an MN, and the configuration information of the MN is used to assist an SN in determining configuration information used for a terminal device; and a receiving unit, configured to receive a first response message from the DU, where the first response message includes the configuration information of the MN. The CU sends the configuration information of the MN to the SN.

With reference to the seventh aspect, in a possible design, the sending unit is further configured to send a second request message to the DU, where the second request message includes configuration information determined by the SN and used to perform inter-node negotiation with the MN. The receiving unit is further configured to receive, from the DU, a second response message in response to the second request message.

With reference to the seventh aspect, in a possible design, the apparatus further includes a determining unit, configured to determine power control mode indication information, where the power control mode indication information is used to negotiate a mode of sharing a power of the terminal device by the MN and the SN. The CU sends the power control mode indication information to the SN.

With reference to the sixth aspect or the seventh aspect, in a possible design, the configuration information of the MN includes one or more of the following information: a long DRX cycle start offset, a DRX slot offset, power headroom configuration information, information about a BC that is of the terminal device and allowed by the MN, FS information corresponding to the information about the BC that is of the terminal device and allowed by the MN, band information, a maximum reference quantity of PDCCH blind detections that is allowed to be configured by the SN, measurement gap configuration information, a measurement gap configuration purpose, or high-frequency measurement gap configuration information.

With reference to the sixth aspect or the seventh aspect, in a possible design, the first request message includes indication information, and the indication information is used to indicate the DU to determine the configuration information of the MN.

With reference to the sixth aspect or the seventh aspect, in a possible design, the first request message is a first context modification request message for the terminal device or a first context setup request message for the terminal device.

With reference to the sixth aspect or the seventh aspect, in a possible design, the first request message includes the information about the BC that is of the terminal device and allowed by the MN.

With reference to the sixth aspect or the seventh aspect, in a possible design, the first request message further includes the band information.

With reference to the sixth aspect or the seventh aspect, in a possible design, the configuration information used to perform inter-node negotiation with the MN includes one or more of the following information: information about a BC selected by the SN, FS information corresponding to the information about the BC selected by the SN, a long DRX cycle start offset of the SN, a DRX slot offset of the SN, or power headroom configuration information of the SN.

With reference to the sixth aspect or the seventh aspect, in a possible design, the configuration information requested by the SN and used to perform inter-node negotiation between the SN and the MN includes one or more of the following information: information about a BC requested by the SN, FS information corresponding to the information about the BC requested by the SN, a quantity of PDCCH blind detections that is requested by the SN, or information for the SN to request to configure a measurement gap.

With reference to the sixth aspect or the seventh aspect, in a possible design, when the request message includes the configuration information requested by the SN and used to perform inter-node negotiation between the SN and the MN, the response message includes configuration information allowed by the DU and used to perform inter-node negotiation between the SN and the MN.

With reference to the sixth aspect or the seventh aspect, in a possible design, when the request message includes the configuration information determined by the SN and used to perform inter-node negotiation with the MN, the response message is used to confirm that the DU has received the configuration information determined by the SN and used to perform inter-node negotiation with the MN.

According to an eighth aspect, an embodiment of this application provides a communication apparatus. The communication apparatus may be CU, and includes: a receiving unit, configured to receive, from an SN, configuration information determined by the SN and used to perform inter-node negotiation with an MN and/or configuration information requested by the SN and used to perform inter-node negotiation between the SN and the MN; and a sending unit, configured to send a request message to a DU, where the request message includes the configuration information determined by the SN and used to perform inter-node negotiation with the MN and/or the configuration information requested by the SN and used to perform inter-node negotiation between the SN and the MN. The receiving unit is further configured to receive, from the DU, a response message in response to the request message.

According to a ninth aspect, an embodiment of this application provides a communication apparatus. The communication apparatus may be a DU, and includes: a receiving unit, configured to receive a request message from a CU, where the request message includes configuration information determined by an SN and used to perform inter-node negotiation with an MN and/or configuration information requested by the SN and used to perform inter-node negotiation between the SN and the MN; and a sending unit, configured to send a response message in response to the request message to the CU.

With reference to the eighth aspect or the ninth aspect, in a possible design, the configuration information determined by the SN and used to perform inter-node negotiation with the MN includes one or more of the following information: information about a BC selected by the SN, FS information corresponding to the information about the BC selected by the SN, a long DRX cycle start offset of the SN, a DRX slot offset of the SN, or power headroom configuration information of the SN.

With reference to the eighth aspect or the ninth aspect, in a possible design, the configuration information requested by the SN and used to perform inter-node negotiation between the SN and the MN includes one or more of the following information: information about a BC requested by the SN, FS information corresponding to the information about the BC requested by the SN, a quantity of PDCCH blind detections that is requested by the SN, or information for the SN to request to configure a measurement gap.

With reference to the eighth aspect or the ninth aspect, in a possible design, when the request message includes the configuration information requested by the SN and used to perform inter-node negotiation between the SN and the MN, the response message includes configuration information allowed by the DU and used to perform inter-node negotiation between the SN and the MN.

With reference to the eighth aspect or the ninth aspect, in a possible design, when the request message includes the configuration information determined by the SN and used to perform inter-node negotiation with the MN, the response message is used to confirm that the DU has received the configuration information determined by the SN and used to perform inter-node negotiation with the MN.

According to a tenth aspect, an embodiment of this application provides a communication apparatus. The communication apparatus may be an SN, and includes: a receiving unit, configured to receive power control mode indication information from an MN, where the power control mode indication information is used to negotiate a mode of sharing a power of a terminal device by the MN and the SN.

In a possible design, the communication apparatus may be a CU of an SN, and includes: a receiving unit, configured to receive power control mode indication information from an MN; and a sending unit, configured to send the power control mode indication information to a DU of the SN.

According to an eleventh aspect, an embodiment of this application further provides a communication apparatus. The communication apparatus may be a DU or a chip. The communication apparatus includes a processor, configured to implement the communication method provided in either the first aspect or the second aspect. The communication apparatus may further include a memory, configured to store program instructions and data. The memory may be a memory integrated into the communication apparatus, or an off-chip memory disposed outside the communication apparatus. The memory is coupled to the processor. The processor may invoke and execute the program instructions stored in the memory, to implement the communication method provided in either the first aspect or the second aspect. The communication apparatus may further include a communication interface, and the communication interface is used by the communication apparatus to communicate with another device (for example, a CU).

According to a twelfth aspect, an embodiment of this application further provides a communication apparatus. The communication apparatus may be a CU or a chip. The communication apparatus includes a processor, configured to implement the communication method provided in either the third aspect or the fourth aspect. The communication apparatus may further include a memory, configured to store program instructions and data. The memory may be a memory integrated into the communication apparatus, or an off-chip memory disposed outside the communication apparatus. The memory is coupled to the processor. The processor may invoke and execute the program instructions stored in the memory, to implement the communication method provided in either the third aspect or the fourth aspect. The communication apparatus may further include a communication interface, and the communication interface is used by the communication apparatus to communicate with another device (for example, a DU).

According to a thirteenth aspect, an embodiment of this application further provides a communication apparatus. The communication apparatus may be an SN or a chip. The communication apparatus includes a processor, configured to implement the communication method provided in the fifth aspect. The communication apparatus may further include a memory, configured to store program instructions and data. The memory may be a memory integrated into the communication apparatus, or an off-chip memory disposed outside the communication apparatus. The memory is coupled to the processor. The processor may invoke and execute the program instructions stored in the memory, to implement the communication method provided in the fifth aspect. The communication apparatus may further include a communication interface, and the communication interface is used by the communication apparatus to communicate with another device (for example, a CU).

According to a fourteenth aspect, an embodiment of this application provides a computer-readable storage medium, including instructions. When the instructions are run on a computer, the computer is enabled to perform the communication method provided in any one of the first aspect to the fifth aspect.

According to a fifteenth aspect, an embodiment of this application provides a computer program product including instructions. When the instructions are run on a computer, the computer is enabled to perform the communication method provided in any one of the first aspect to the fifth aspect.

According to a sixteenth aspect, an embodiment of this application provides a chip system. The chip system includes a processor, and may further include a memory. The chip system is configured to implement the communication method provided in any one of the first aspect to the fifth aspect. The chip system may include a chip, or may include a chip and another discrete device.

According to a seventeenth aspect, an embodiment of this application provides a communication system, where the system includes an MN and an SN, and the MN includes the DU in the sixth aspect and the CU in the seventh aspect, or the system includes the CU in the eighth aspect and the DU in the ninth aspect.

DESCRIPTION OF EMBODIMENTS

To make descriptions of the following embodiments clear and concise, related concepts or technologies are first briefly described.

DC communication: In DC communication, both an MN (which may also be referred to as a master station or a master base station) and an SN (which may also be referred to as a secondary station or a secondary base station) establish a radio link to a terminal device. DC may include multi-RAT dual connectivity (multi-RAT dual connectivity, MR-DC). MR-DC is a dual connectivity technology that can support different access technologies. MR-DC may include the following scenarios:

1. Evolved Universal Terrestrial Radio Access (Evolved Universal Terrestrial Radio Access, E-UTRA)-New Radio (New Radio, NR) Dual Connectivity (E-UTRA-NR Dual Connectivity, EN-DC)

Figure 1:
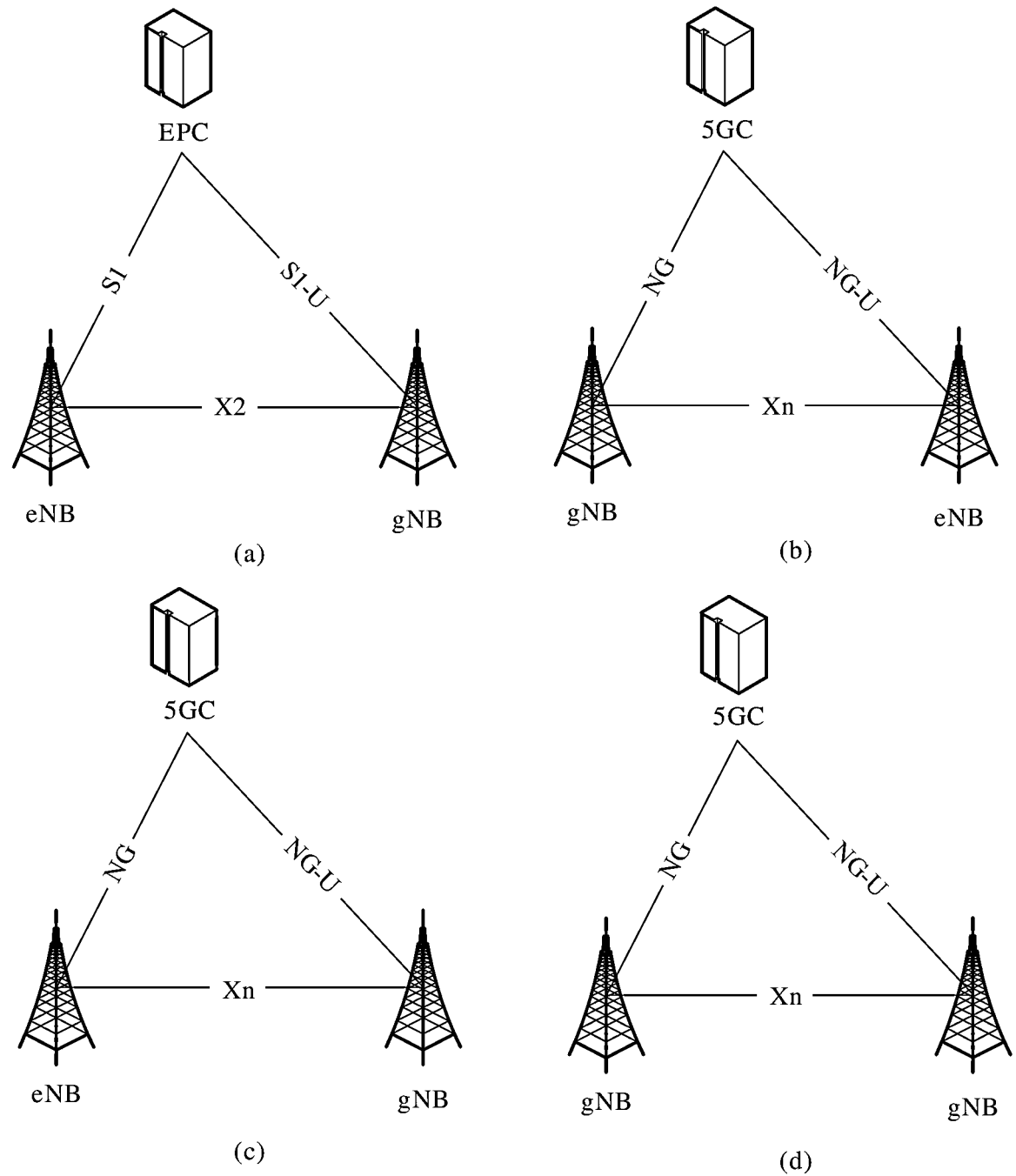
FIG. 1 is a schematic diagram of an MR-DC architecture according to an embodiment of this application.

As shown in (a) in FIG. 1, a core network is an evolved packet core (evolved packet core, EPC), the MN is an evolved NodeB (evolved NodeB, eNB), and the SN is a new radio NodeB (new radio nodeB, gNB). The MN may be connected to the SN through an X2 interface, and there may be a user plane connection between the MN and the SN. The MN may be connected to the core network through an S1 interface, there may be a user plane connection between the MN and the core network, and there may be a control plane connection between the MN and the core network. The SN may be connected to the core network through an S1-U interface, and there may be a user plane connection between the SN and the core network. The eNB may provide an air interface resource for a terminal device based on at least one long term evolution (long term evolution, LTE) cell. In this case, the at least one LTE cell is referred to as a master cell group (master cell group, MCG). Correspondingly, the gNB may also provide an air interface resource for the terminal device based on at least one NR cell. In this case, the at least one NR cell is referred to as a secondary cell group (secondary cell group, SCG).

2. NR-E-UTRA Dual Connectivity (E-UTRA Dual Connectivity, NG-DC)

As shown in (b) in FIG. 1, a core network is a 5th generation (5G, 5th Generation) core network (5G core, 5GC), the MN is a gNB, and the SN is an eNB. The MN may be connected to the SN through, for example, an Xn interface, and there may be a user plane connection between the MN and the SN. The MN may be connected to the core network through, for example, an NG interface, there may be a user plane connection between the MN and the core network, and there may be a control plane connection between the MN and the core network. The SN may be connected to the core network through, for example, an NG-U interface, and there may be a user plane connection between the SN and the core network. The gNB may provide an air interface resource for a terminal device based on at least one NR cell. In this case, the at least one NR cell is referred to as an MCG. Correspondingly, the eNB may also provide an air interface resource for the terminal device based on at least one LTE cell. In this case, the at least one LTE cell is referred to as an SCG.

3. Next Generation (Next Generation, NG) Radio Access Network (Radio Access Network, RAN) EUTRA-NR Dual Connectivity (NG-RAN E-UTRA-NR Dual Connectivity, NGEN-DC)

As shown in (c) in FIG. 1, a core network is a 5GC, the MN is an eNB, and the SN is a gNB. The MN may be connected to the SN through an Xn interface, and there may be a user plane connection between the MN and the SN. The MN may be connected to the core network through an NG interface, there may be a user plane connection between the MN and the core network, and there may be a control plane connection between the MN and the core network. The SN may be connected to the core network through an NG-U interface, and there may be a user plane connection between the SN and the core network. The eNB may provide an air interface resource for a terminal device based on at least one LTE cell. In this case, the at least one LTE cell is referred to as an MCG. Correspondingly, the gNB may also provide an air interface resource for the terminal device based on at least one NR cell. In this case, the at least one NR cell is referred to as an SCG.

4. NR Dual Connectivity

As shown in (d) in FIG. 1, a core network is a 5GC, the MN is a gNB, and the SN is also a gNB. The MN may be connected to the SN through an Xn interface, and there may be a user plane connection between the MN and the SN. The MN may be connected to the core network through an NG interface, there may be a user plane connection between the MN and the core network, and there may be a control plane connection between the MN and the core network. The SN may be connected to the core network through an NG-U interface, and there may be a user plane connection between the SN and the core network. The gNB corresponding to the MN may provide an air interface resource for a terminal device based on at least one NR cell. In this case, the at least one NR cell is referred to as an MCG. Correspondingly, the gNB corresponding to the SN may also provide an air interface resource for the terminal device based on at least one NR cell. In this case, the at least one NR cell is referred to as an SCG.

CU-DU architecture: Currently, a CU-DU architecture is introduced in a distributed radio access network, to reduce deployment costs of an access network device. To be specific, a radio access network side, for example, a base station, is divided into a CU and a DU. In an example of protocol stack distribution, an RRC protocol stack and a PDCP protocol stack may be distributed in the CU, and an RLC protocol stack and a MAC protocol stack may be distributed in the DU. Alternatively, there are other protocol stack distribution manners for the CU and the DU. For example, the RRC protocol stack may be distributed in the CU, and the PDCP, RLC, and MAC protocol stacks may be distributed in the DU. This is not limited in this application.

It should be understood that the CU and the DU in embodiments of this application are merely a naming manner, and other possible names may be defined in an existing or future protocol to replace the foregoing names.

Inter-node negotiation: In a DC system, both an MN and an SN may keep connected to a terminal device. To prevent a joint configuration of the MN and the SN from exceeding a capability of the terminal device, or to simplify internal implementation of the terminal device, the MN and the SN may negotiate the capability of the terminal device, or the MN and the SN may negotiate configuration information generated by each other for the terminal device.

For example, in the DC scenario, a radio frequency capability and a baseband capability of the terminal device are shared by the MN and the SN. To ensure that configurations of both the MN and the SN can be accepted by the terminal device (not exceeding the capability of the terminal device), the radio frequency capability and the baseband capability of the terminal device need to be negotiated between the MN and the SN. For example, the MN may send, to the SN, information about a BC that is of the terminal device and allowed by the MN. The information about the BC that is of the terminal device and allowed by the MN may be a BC list, and the BC list includes one or more BCs. Each BC corresponds to one FS list (allowedFeastureSetsList), and the FS list includes one or more FSs. The SN may select a BC from the BC list, select an FS from an FS list corresponding to the BC, and notify the MN. The BC may be understood as the radio frequency capability of the terminal device, and the FS may be understood as the baseband capability of the terminal device. It should be noted that, in addition to the BC and the FS, there are other capabilities of the terminal device that are shared between the MN and the SN, which are not enumerated one by one herein.

Figure 2:
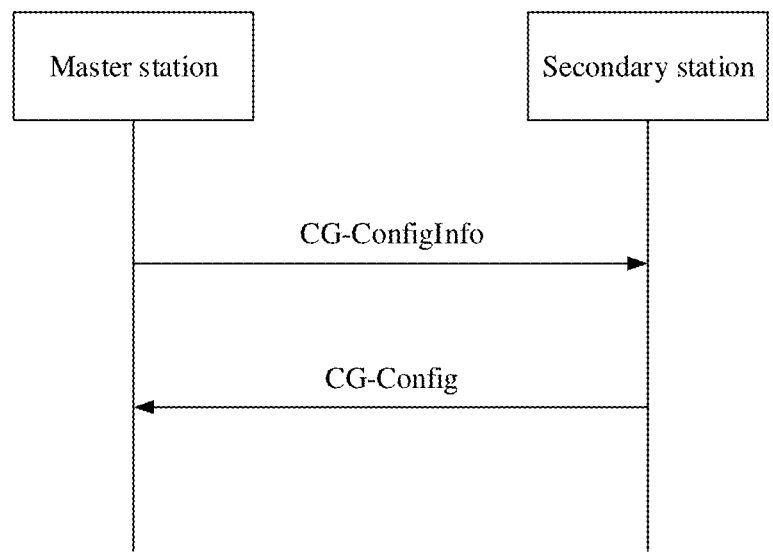
FIG. 2 is a schematic diagram of signal exchange in inter-node negotiation according to an embodiment of this application.

Inter-node negotiation may be performed between the MN and the SN by using an inter-node message (inter-node message). As shown in FIG. 2, the MN and the SN may perform inter-node negotiation by using inter-node messages such as CG-ConfigInfo and CG-Config. When the MN uses a CU-DU architecture, interaction may be performed between a CU (namely, MN-CU, CU for short below) and the SN. Because the CU is responsible for higher-layer configuration (for example, configuration related to an RRC layer and a PDCP layer), and the DU (namely, MN-DU, referred to as DU for short below) is responsible for lower-layer configuration (for example, configuration related to a MAC layer and a physical layer), the CU cannot determine lower layer configuration information in CG-ConfigInfo. Consequently, interaction between the CU and the SN cannot be completed.

An embodiment of this application provides a communication method. In a DC scenario, when an MN uses a CU-DU architecture, a CU may send a first request message to a DU, to request the DU to generate configuration information (namely, lower layer configuration information in CG-ConfigInfo) of the MN. The configuration information of the MN is used to assist an SN in generating configuration information of a terminal device. In this way, the CU can obtain lower layer configuration information in an inter-node message from the DU, so that the CU can determine a complete CG-ConfigInfo message, and send the CG-ConfigInfo message to the SN, to complete an inter-node negotiation process between the MN and the SN.

Figure 3:
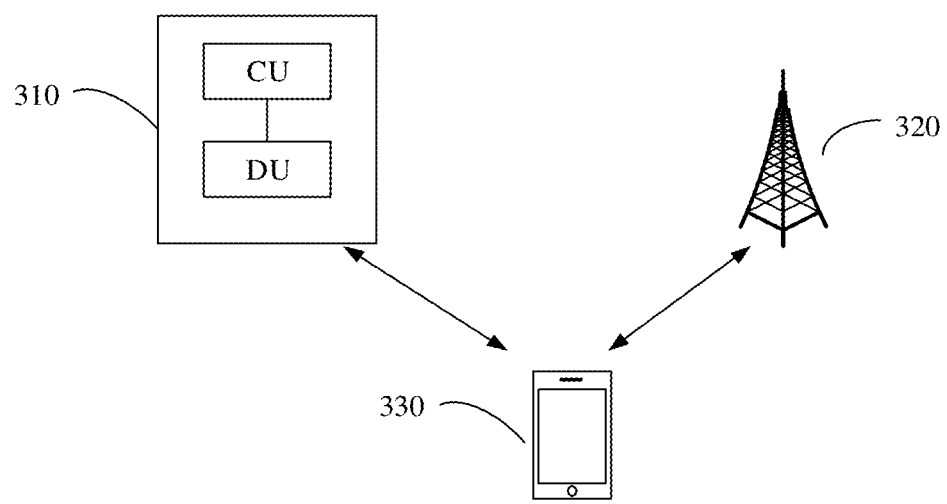
FIG. 3 is a schematic diagram of a communication system according to an embodiment of this application.

FIG. 3 is a schematic diagram of a communication system 300 to which an embodiment of this application is applicable. As shown in FIG. 3, the communication system 300 may include at least two network devices, for example, a network device 310 and a network device 320 shown in FIG. 3. The network device 310 may be, for example, an MN, and the network device 320 may be, for example, an SN. The network device 310 (namely, the MN) may use a CU-DU architecture. When the MN is a gNB, a CU may be connected to a DU through an F1 interface. When the MN is an eNB, the CU may be connected to the DU through a W1 interface. The CU and the DU may be physically separated or deployed together. In a possible design, one DU may be connected to a plurality of CUs (not shown in the figure), or a plurality of DUs may share one CU. This is not limited in this application. The communication system 300 may further include at least one terminal device, for example, a terminal device 330 shown in FIG. 3. The terminal device 330 may establish a radio link with both the network device 310 and the network device 320. In addition, in embodiments of this application, the network device 320 (namely, the SN) may use a CU-DU architecture or may not use a CU-DU architecture. This is not limited in this application.

The terminal device may also be referred to as a terminal, and the terminal may be a wireless terminal or a wired terminal. The wireless terminal may refer to a device that provides a user with voice and/or data connectivity, a handheld device with a radio connection function, or another processing device connected to a radio modem. The wireless terminal may communicate with one or more core networks through a radio access network (radio access network, RAN). The wireless terminal may be a mobile terminal such as a mobile phone (also referred to as a "cellular" phone) and a computer having a mobile terminal. For example, the wireless terminal may be a portable, pocket-sized, handheld, computer built-in, or vehicle-mounted mobile apparatus, or may be a personal communication service (personal communication service, PCS) phone, a cordless phone, a session initiation protocol (session initiation protocol, SIP) phone, a wireless local loop (wireless local loop, WLL) station, a personal digital assistant (personal digital assistant, PDA), or the like. The wireless terminal may also be referred to as a system, a subscriber unit (subscriber unit), a subscriber station (subscriber station), a mobile station (mobile station), a remote station (remote station), a remote terminal (remote terminal), an access terminal (access terminal), a user agent (user agent), or user equipment or apparatus (user device or user equipment). The wireless terminal may alternatively be a desktop computer, a portable computer, a network server, a palmtop computer (personal digital assistant, PDA), a mobile phone, a tablet computer, a wireless terminal device, a communication device, an embedded device, or the like. This is not limited herein.

The CU, the DU, or the SN in FIG. 3 in embodiments of this application may be implemented by one device, or may be a function module in a device. This is not specifically limited in embodiments of this application. It may be understood that the foregoing function may be a network element in a hardware device, a software function running on dedicated hardware, a virtualized function instantiated on a platform (for example, a cloud platform), or a chip system. In embodiments of this application, the chip system may include a chip, or may include a chip and another discrete device.

Figure 4:
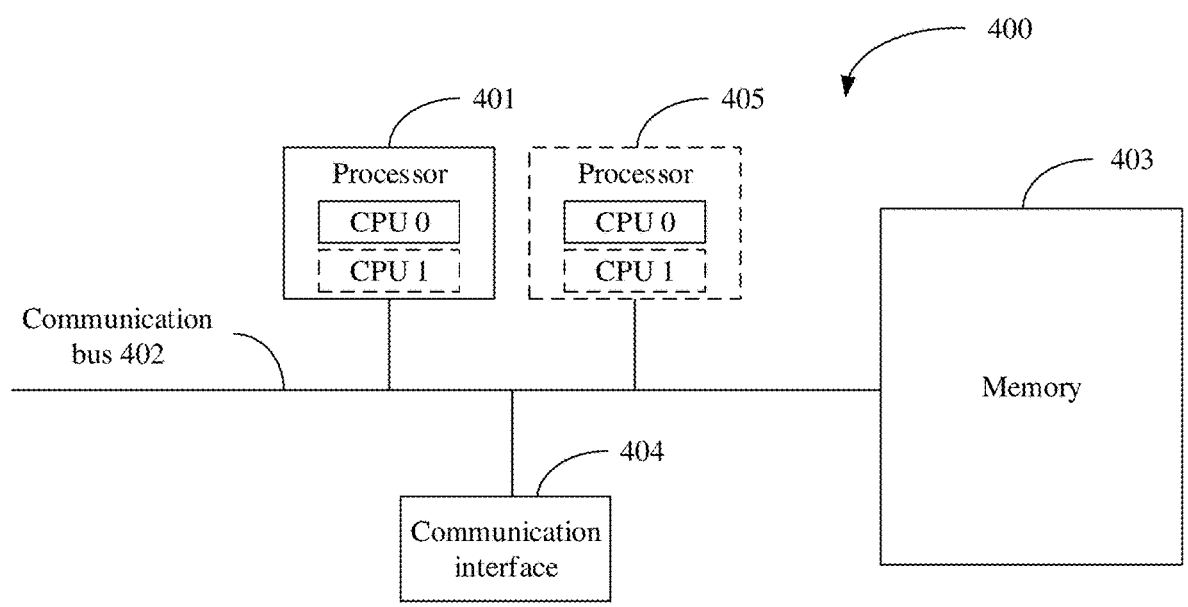
FIG. 4 is a schematic diagram of a structure of a DU/CU/SN according to an embodiment of this application.

For example, an apparatus for implementing a function of the CU, the DU, or the SN provided in embodiments of this application may be implemented by an apparatus 400 in FIG. 4. FIG. 4 is a schematic diagram of a hardware structure of the apparatus 400 according to an embodiment of this application. The apparatus 400 includes at least one processor 401, configured to implement the function of the CU, the DU, or the SN provided in embodiments of this application. The apparatus 400 may further include a communication bus 402 and at least one communication interface 404. The apparatus 400 may further include a memory 403.

In this embodiment of this application, the processor may be a central processing unit (central processing unit, CPU), a general-purpose processor, a network processor (network processor, NP), a digital signal processor (digital signal processor, DSP), a microprocessor, a microcontroller, or a programmable logic device (programmable logic device, PLD). The processor may alternatively be any other apparatus having a processing function, for example, an application-specific integrated circuit (application-specific integrated circuit, ASIC), a field programmable gate array (Field Programmable Gate Array, FPGA) or another programmable logic device, a transistor logic device, a hardware component, a software module, or any combination thereof.

The communication bus 402 may be used for transmitting information between the foregoing components.

The communication interface 404 is configured to communicate with another device or a communication network, for example, an Ethernet, a radio access network (radio access network, RAN), or a wireless local area network (wireless local area network, WLAN). The communication interface 404 may be an interface, a circuit, a transceiver, or another apparatus that can implement communication. This is not limited in this application. The communication interface 404 may be coupled to the processor 401. The coupling in embodiments of this application is an indirect coupling or a communication connection between apparatuses, units, or modules in an electrical form, a mechanical form, or another form, and is used for information exchange between the apparatuses, the units, or the modules.

In embodiments of this application, the memory may be a read-only memory (read-only memory, ROM) or another type of static storage device that can store static information and instructions, a random access memory (random access memory, RAM) or another type of dynamic storage device that can store information and instructions, an electrically erasable programmable read-only memory (electrically erasable programmable read-only memory, EEPROM), a compact disc read-only memory (compact disc read-only memory, CD-ROM), another compact disc storage, optical disc storage (including a compact disc, a laser disc, an optical disc, a digital versatile disc, a Blu-ray optical disc, and the like), or magnetic disk storage medium, another magnetic storage device, or any other medium that can be used to carry or store expected program code in a form of instructions or a data structure and that can be accessed by a computer. However, the memory is not limited thereto. The memory may exist independently; or may be coupled to the processor, for example, through the communication bus 402. Alternatively, the memory may be integrated with the processor.

The memory 403 is configured to store program instructions, and the processor 401 controls the execution, to implement the communication method provided in the following embodiments of this application. The processor 401 is configured to invoke and execute the instructions stored in the memory 403, to implement the communication method provided in the following embodiments of this application.

Optionally, the computer-executable instructions in this embodiment of this application may also be referred to as application program code. This is not specifically limited in this embodiment of this application.

Optionally, the memory 403 may be included in the processor 401.

During specific implementation, in an embodiment, the processor 401 may include one or more CPUs, for example, a CPU 0 and a CPU 1 in FIG. 4.

During specific implementation, in an embodiment, the apparatus 400 may include a plurality of processors, for example, the processor 401 and a processor 405 in FIG. 4. Each of the processors may be a single-core (single-CPU) processor, or may be a multi-core (multi-CPU) processor. The processor herein may refer to one or more devices, circuits, and/or processing cores configured to process data (for example, computer program instructions).

The following describes the technical solutions in embodiments of this application with reference to the accompanying drawings in embodiments of this application. In the descriptions of this application, unless otherwise specified, "a plurality of" means two or more.

In addition, to clearly describe the technical solutions in embodiments of this application, words such as "first" and "second" are used in embodiments of this application to distinguish between same items or similar items that have basically the same functions or purposes. A person skilled in the art may understand that the terms such as "first" and "second" do not limit a quantity or an execution sequence, and that the terms such as "first" and "second" do not indicate a definite difference.

Figure 5A:
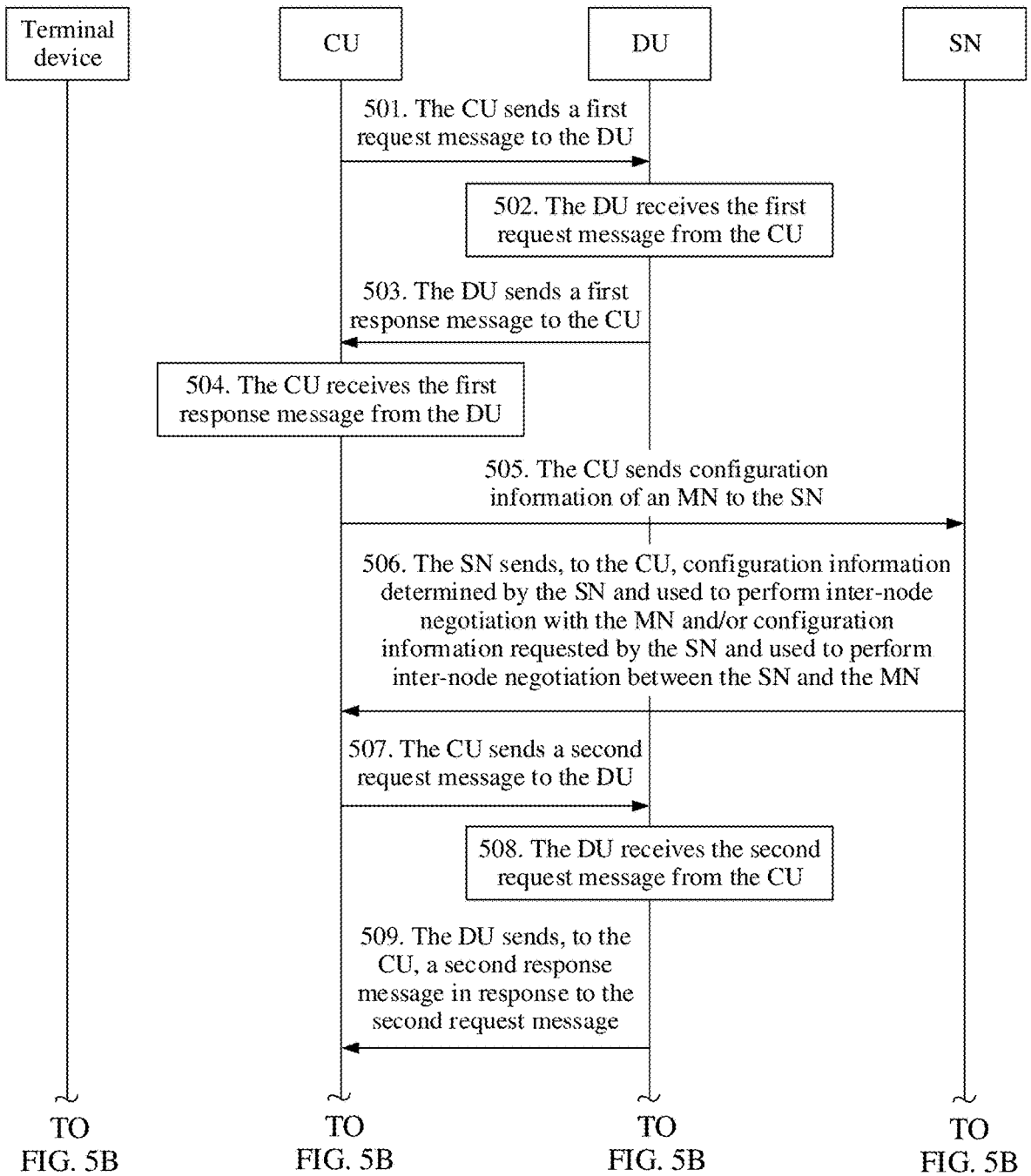
FIG. 5A and FIG. 5B are a schematic diagram of signal exchange applicable to a communication method according to an embodiment of this application.
Figure 5B:
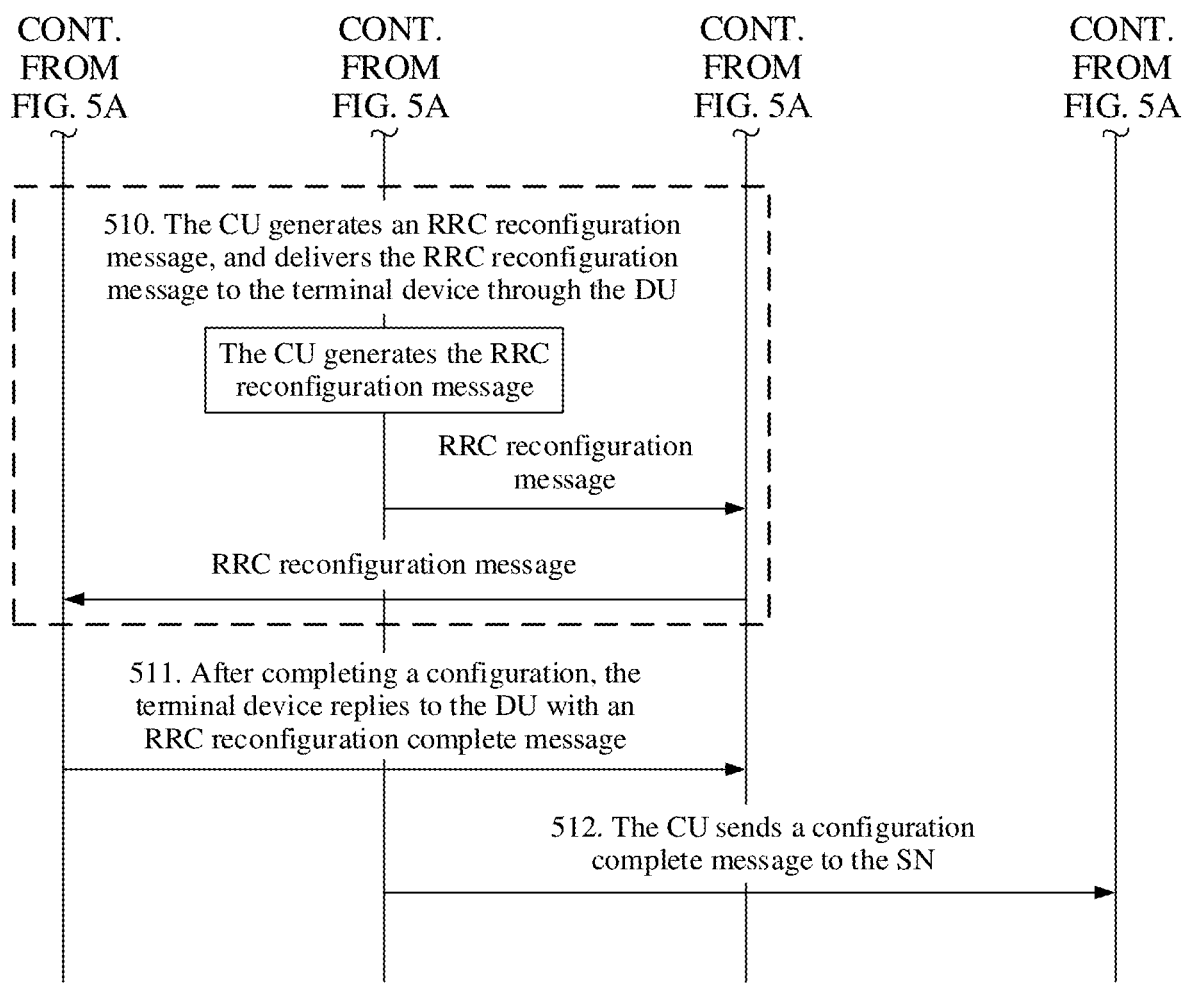

An embodiment of this application provides a communication method. An example in which an MN initiates an inter-node negotiation procedure (for example, a secondary station addition procedure initiated by the MN, or a secondary station modification procedure initiated by the MN) is used for description. As shown in FIG. 5A and FIG. 5B, the method includes the following steps.

501. A CU sends a first request message to a DU, where the first request message is used to request the DU to determine configuration information of the MN, and the configuration information of the MN is used to assist an SN in determining configuration information used for a terminal device.

The CU may be a CU of the MN (unless otherwise specified, the CU described below is the CU of the MN), and the DU may be a DU of the MN (unless otherwise specified, the DU described below is the DU of the MN). Before configuring a DC parameter for the terminal device, the CU may negotiate a capability of the terminal device with the SN. For example, the CU may negotiate the capability of the terminal device with the SN by sending a CG-ConfigInfo message to the SN. Because the CU cannot generate lower layer configuration information in the CG-ConfigInfo message, to generate a complete CG-ConfigInfo message, the CU may send the first request message to the DU, where the first request message is used to request the DU to determine the configuration information (that is, the lower layer configuration information in the CG-ConfigInfo message) of the MN, and the configuration information of the MN is used to assist the SN in determining the configuration information used for the terminal device.

In a possible design, the first request message includes indication information, and the indication information is used to indicate the DU to determine the configuration information of the MN. For example, the indication information may be information about a BC allowed by the MN.

In some embodiments, the first request message may be a first terminal device context modification request (UE Context Modification Request) message or a first terminal device context setup request (UE Context Setup Request) message. It should be understood that, when the first context modification request message for the terminal device or the first context setup request message for the terminal device includes the indication information, it may be considered that the first context modification request message for the terminal device or the first context setup request message for the terminal device has a function of requesting the DU to determine the configuration information of the MN. Certainly, the first context modification request message for the terminal device or the first context setup request message for the terminal device may further have another function. This is not limited in this application.

In some other embodiments, the first request message may be a specially introduced new request message, and the newly introduced request message is used to request the DU to determine the configuration information of the MN.

Optionally, the newly introduced request message includes the indication information, and the indication information is used to indicate the DU to determine the configuration information of the MN.

502. The DU receives the first request message from the CU.

For related descriptions of the first request message, refer to step 501. Details are not described herein again.

In some other embodiments, step 501 and step 502 may be replaced with the following steps: A CU may send indication information to a DU, where the indication information is used to request the DU to determine configuration information of the MN. Correspondingly, the DU receives the indication information from the CU. Optionally, the indication information may be included (carried) in a message sent by the CU to the DU, for example, included in a first context modification request message for the terminal device, a first context setup request message for the terminal device, or a newly introduced request message. This is not limited in this application.

503. The DU sends a first response message to the CU, where the first response message includes the configuration information of the MN.

The DU may determine the configuration information of the MN based on the first request message received from the CU, include the configuration information of the MN in the first response message, and send the first response message to the CU.

The configuration information of the MN may include one or more of the following information: a long DRX cycle start offset, a DRX slot offset, power headroom configuration information, information about a BC that is of the terminal device and allowed by the MN, FS information corresponding to the information about the BC that is of the terminal device and allowed by the MN, band information, a maximum reference quantity of PDCCH blind detections that is allowed to be configured by the SN, measurement gap configuration information, a measurement gap configuration purpose, or high-frequency measurement gap configuration information.

The information about the BC allowed by the MN may be determined by the DU based on capability information reported by the terminal device. Specifically, the DU may determine, from information that is about a BC supported by the terminal device and that is reported by the terminal device, information about a BC allowed (supported) by the DU. Because the FS information corresponds to the information about the BC, if the information about the BC that is of the terminal device and allowed by the MN is determined, the FS information corresponding to the information about the BC that is of the terminal device and allowed by the MN is correspondingly determined. For example, the information about the BC that is of the terminal device and allowed by the MN may be a BC list, and the BC list includes one or more BCs. Each BC corresponds to one FS list and the FS list includes one or more FSs. The FS may specifically include a bandwidth, a subcarrier spacing, a quantity of multiple input multiple output (multiple input multiple output, MIMO) layers, a modulation order, a maximum port quantity, and the like that can be supported by the terminal device. The band information is band information (that is, a band selected by the MN from a band set corresponding to each BC in the BC list) selected by the MN and additionally indicated based on the information about the BC that is of the terminal device and allowed by the MN, to avoid a conflict between the SN and the MN when the SN selects band information. The measurement gap configuration information may be at a frequency level or a terminal device level. The measurement gap configuration purpose may indicate whether the measurement gap configuration information is at a terminal device level or a frequency level. If the measurement gap configuration information is at a terminal device level, the terminal device uses a same set of measurement gap configuration information when measuring a high frequency (FR2) and a low frequency (FR1). If the measurement gap configuration information is at a frequency level, FR2 and FR1 need to be distinguished for a measurement gap of the terminal device. In other words, a gap used by the terminal device to measure FR1 and a gap used by the terminal device to measure FR2 are independently configured.

In some embodiments, the first response message may be a first terminal device context modification request response message or a first terminal device context setup request response message. In some other embodiments, the first response message may alternatively be a specially introduced new response message. This is not limited in this application.

504. The CU receives the first response message from the DU.

For the first response message, refer to the related descriptions in step 503. Details are not described herein again.

505. The CU sends the configuration information of the MN to the SN.

After receiving the first response message sent by the DU, the CU may obtain the configuration information of the MN from the first response message, and then may include the configuration information of the MN in the CG-ConfigInfo message and send the CG-ConfigInfo message to the SN.

The long DRX cycle start offset in the configuration information of the MN may be carried in a drx-LongCycleStartOffset field in the CG-ConfigInfo message. The DRX slot offset may be carried in a drx-SlotOffset field. The power headroom configuration information may be carried in a ph-InfoMCG field. The information about the BC that is of the terminal device and allowed by the MN and the FS information corresponding to the information about the BC that is of the terminal device and allowed by the MN may be carried in an allowedBC-ListMRDC field. The band information may be carried in a selectedBandEntriesMNList field. The maximum reference quantity of PDCCH blind detections that is allowed to be configured by the SN may be carried in a pdcch-BlindDetectionSCG field. The measurement gap configuration information may be carried in a measGapConfig field. The measurement gap configuration purpose may be carried in a gapPurpose field. The high-frequency measurement gap configuration information may be carried in a measGapConfigFR2 field.

It should be understood that, in a secondary station addition scenario, the CU may send a secondary station addition request message to the SN, where the secondary station addition request message includes the CG-ConfigInfo message. In a secondary station modification scenario, the CU may send a secondary station modification request message to the SN, where the secondary station modification request message includes the CG-ConfigInfo message.

In a possible design, the CG-ConfigInfo message may further include power control mode indication information determined by the CU, and the power control mode indication information is used to negotiate a mode of sharing a power of the terminal device by the MN and the SN. For example, the power control mode may be a first semi-static power sharing mode, a second semi-static power sharing mode, or a dynamic power sharing mode.

For example, the terminal device may receive a first maximum power and a second maximum power from the DU of the MN, where the first maximum power is a maximum power that can be used to send an uplink signal to the MN, and the second maximum power is maximum power that can be used to send an uplink signal to the SN. A sum of the first maximum power and the second maximum power is less than or equal to a maximum total power supported by the terminal device. When the first semi-static power sharing mode is used, the terminal device sends an uplink signal to the MN by using a power that is not allowed to exceed the first maximum power, and the terminal device sends an uplink signal to the SN by using a power that is not allowed to exceed the second maximum power. When the second semi-static power sharing mode is used, the terminal device may further receive a target slot configured by the SN. In the target slot, the terminal device sends an uplink signal to the MN by using a power that is not allowed to exceed the first maximum power, and the terminal device sends an uplink signal to the SN by using a power that is not allowed to exceed the second maximum power. In another slot different from the target slot, the terminal device may perform uplink transmission by using the maximum total power supported by the terminal device. When the dynamic power sharing mode is used, when sending an uplink signal to the MN or the SN at different time points, the terminal device may perform uplink transmission by using a target power greater than the first maximum power and/or the second maximum power, where the target power does not exceed the maximum total power supported by the terminal device.

Optionally, when the MN and the SN need to negotiate configuration information to be generated by each other for the terminal device, step 506 to step 509 may be further included.

506. The SN sends, to the CU, configuration information determined by the SN and used to perform inter-node negotiation with the MN and/or configuration information requested by the SN and used to perform inter-node negotiation between the SN and the MN.

For example, after receiving the CG-ConfigInfo message sent by the CU, the SN may reply with a CG-Config message to the CU. The CG-Config message may include the configuration information determined by the SN and used to perform inter-node negotiation with the MN and/or the configuration information requested by the SN and used to perform inter-node negotiation between the SN and the MN. The configuration information requested by the SN and used to perform inter-node negotiation between the SN and the MN may be configuration information requested by the SN from the MN in an inter-node negotiation process. Because the MN uses a CU-DU architecture, and the DU is responsible for a lower protocol layer, the DU may determine, based on a request of the SN, configuration information allowed by the DU and used to perform inter-node negotiation between the SN and the MN.

The configuration information determined by the SN and used to perform inter-node negotiation with the MN includes one or more of the following information: information about a BC selected by the SN (for example, a BC selected by the SN from a BC list provided by the MN), FS information corresponding to the information about the BC selected by the SN, a long DRX cycle start offset of the SN, a DRX slot offset of the SN, or power headroom configuration information of the SN. The configuration information requested by the SN and used to perform inter-node negotiation between the SN and the MN includes one or more of the following information: information about a BC requested by the SN, FS information corresponding to the information about the BC requested by the SN, a quantity of PDCCH blind detections that is requested by the SN, or information for the SN to request to configure a gap.

The information about the BC selected by the SN and the FS information corresponding to the information about the BC selected by the SN may be carried in a selectedBand-Combination field in the CG-Config message. The long DRX cycle start offset of the SN may be carried in a drx-LongCycleStartOffset field. The DRX slot offset of the SN may be carried in a drx-SlotOffset field. The power headroom configuration information of the SN may be carried in a ph-InfoSCG field. The information about the BC requested by the SN and the FS information corresponding to the information about the BC requested by the SN may be carried in a requestedBC-MRDC field. The quantity of PDCCH blind detections that is requested by the SN may be carried in a requestedPDCCH-BlindDetectionSCG field. The information for the SN to request to configure a gap may be carried in a needForGaps field.

It should be noted that the CG-Config message may further include the configuration information used for the terminal device, and the configuration information used for the terminal device is determined by the SN based on the configuration information of the MN. The SN may send the configuration information used for the terminal device to the CU by using the CG-Config message, and the CU transparently transmits the configuration information used for the terminal device to the terminal device through the DU, so that the terminal device performs DC communication based on the configuration information used for the terminal device. The configuration information used for the terminal device may be carried in an scg-CellGroupConfig field in the CG-Config message. Optionally, the configuration information used for the terminal device may alternatively be carried in an scg-RB-Config field.

In the secondary station addition scenario, the SN may send a secondary station addition request confirm message to the CU, where the secondary station addition request confirm message includes the CG-Config message. In the secondary station modification scenario, the SN may send a secondary station modification request confirm message to the CU, where the secondary station modification request confirm message includes the CG-Config message.

In addition, when the CG-ConfigInfo message sent by the CU includes the power control mode indication information and the SN uses a CU-DU architecture, after receiving the power control mode indication information from the CU of the MN, a CU of the SN may send the power control mode indication information to a DU of the SN, so that the DU of the SN determines a power control mode currently used by the MN and the SN.

507. The CU sends a second request message to the DU.

After receiving the CG-Config message sent by the SN, the CU may obtain, from the CG-Config message, the configuration information determined by the SN and used to perform inter-node negotiation with the MN and/or the configuration information requested by the SN and used to perform inter-node negotiation between the SN and the MN, and send the configuration information to the DU by using the second request message.

In some embodiments, the second request message may be a second terminal device context modification request message or a second terminal device context setup request message. In some other embodiments, the second request message may be another existing message or a newly introduced request message. This is not limited in this application.

508. The DU receives the second request message from the CU.

For the second request message, refer to the related descriptions in step 507. Details are not described herein again.

509. The DU sends, to the CU, a second response message in response to the second request message.

When the second request message includes the configuration information determined by the SN and used to perform inter-node negotiation with the MN, the second response message is used to confirm that the DU has received the configuration information determined by the SN and used to perform inter-node negotiation with the MN. When the second request message further includes the configuration information requested by the SN and used to perform inter-node negotiation between the SN and the MN, the DU may determine, based on the request of the SN, the configuration information allowed by the DU and used to perform inter-node negotiation between the SN and the MN, and feed back the configuration information to the CU by using the second response message, so that the CU feeds back, to the SN, the configuration information allowed by the DU and used to perform inter-node negotiation between the SN and the MN.

For example, for the information for the SN to request to configure a gap, the DU may reply with the measurement gap configuration information. For the information about the BC requested by the SN and the FS information corresponding to the information about the BC requested by the SN, the DU may reply with a response message to indicate confirmation, or may include other indication information in the response message to indicate confirmation. Alternatively, for the information about the BC requested by the SN and the FS information corresponding to the information about the BC requested by the SN, the DU may reply with information about the BC allowed by the DU and FS information corresponding to the information about the BC allowed by the DU. For example, assuming that the SN requests a BC 1 and an FS corresponding to the BC1, if the DU allows the BC 1 and the FS corresponding to the BC 1, the DU may indicate the BC 1 and the FS corresponding to the BC 1 to the SN through the CU. For the quantity of PDCCH blind detections that is requested by the SN, the DU may feed back a quantity of PDCCH blind detections allowed by the DU. The quantity of PDCCH blind detections allowed by the DU may be greater than, less than, or equal to the quantity of PDCCH blind detections that is requested by the SN. In addition, if the DU does not support the configuration information (for example, the BC 1 and the FS corresponding to the BC 1 that are requested by the SN) requested by the SN and used to perform inter-node negotiation with the MN, the DU may send a terminal device context setup failure (UE context setup failure) message or a terminal device context modification failure (UE context modification failure) message to the CU to indicate negation or refusal, so that the CU notifies the SN that the request of the SN is refused.

In some embodiments, the second response message may be a second terminal device context modification request response message or a second terminal device context setup request response message. In some other embodiments, the second response message may alternatively be another existing message or a newly introduced response message. This is not limited in this application.

Optionally, when configuration of the terminal device needs to be updated, step 510 to step 512 may be further included.

510. The CU generates an RRC reconfiguration message, and delivers the RRC reconfiguration message to the terminal device through the DU.

The RRC reconfiguration message may include the configuration information that is determined by the SN and that is used for the terminal device. Optionally, the RRC reconfiguration message may further include configuration information that is determined or updated by the MN and that is used for the terminal device.

The CU may send the RRC reconfiguration message to the terminal device through the DU.

Optionally, the CU may alternatively send the RRC reconfiguration message to the DU in step 507, and the DU sends the RRC reconfiguration message to the terminal device. For example, the CU may include the RRC reconfiguration message in the second terminal device context modification request message, and send the second terminal device context modification request message to the DU. The DU sends the RRC reconfiguration message to the terminal device. It may be understood that the second terminal device context modification request message may be an interface message. The interface message may include a container (container), and the RRC reconfiguration message may be carried in the container.

511. After completing configuration, the terminal device replies to the DU with an RRC reconfiguration complete message.

After determining that an RRC reconfiguration of the terminal device is completed, the DU may reply to the CU that the RRC reconfiguration of the terminal device is completed.

512. The CU sends a configuration complete message to the SN.

After determining that the RRC reconfiguration of the terminal device is completed, the CU may send an RRC configuration complete message to the SN, to notify the SN that the RRC reconfiguration of the terminal device is completed.

Based on the method provided in this embodiment of this application, when the MN uses a CU-DU architecture, the CU may send the first request message to the DU, to request the DU to generate the configuration information (namely, lower layer configuration information in an inter-node message) of the MN. The configuration information of the MN is used to assist the SN in generating the configuration information used for the terminal device in a DC scenario. In this way, the CU can obtain the lower layer configuration information in the inter-node message from the DU, and then send the lower layer configuration information to the SN, for example, may send the lower layer configuration information to the SN by using the CG-ConfigInfo message, to complete an inter-node negotiation process between the MN and the SN. That is, the MN and the SN negotiate a capability of the terminal device based on corresponding configuration information, to implement DC configuration on the terminal device.

Figure 6A:
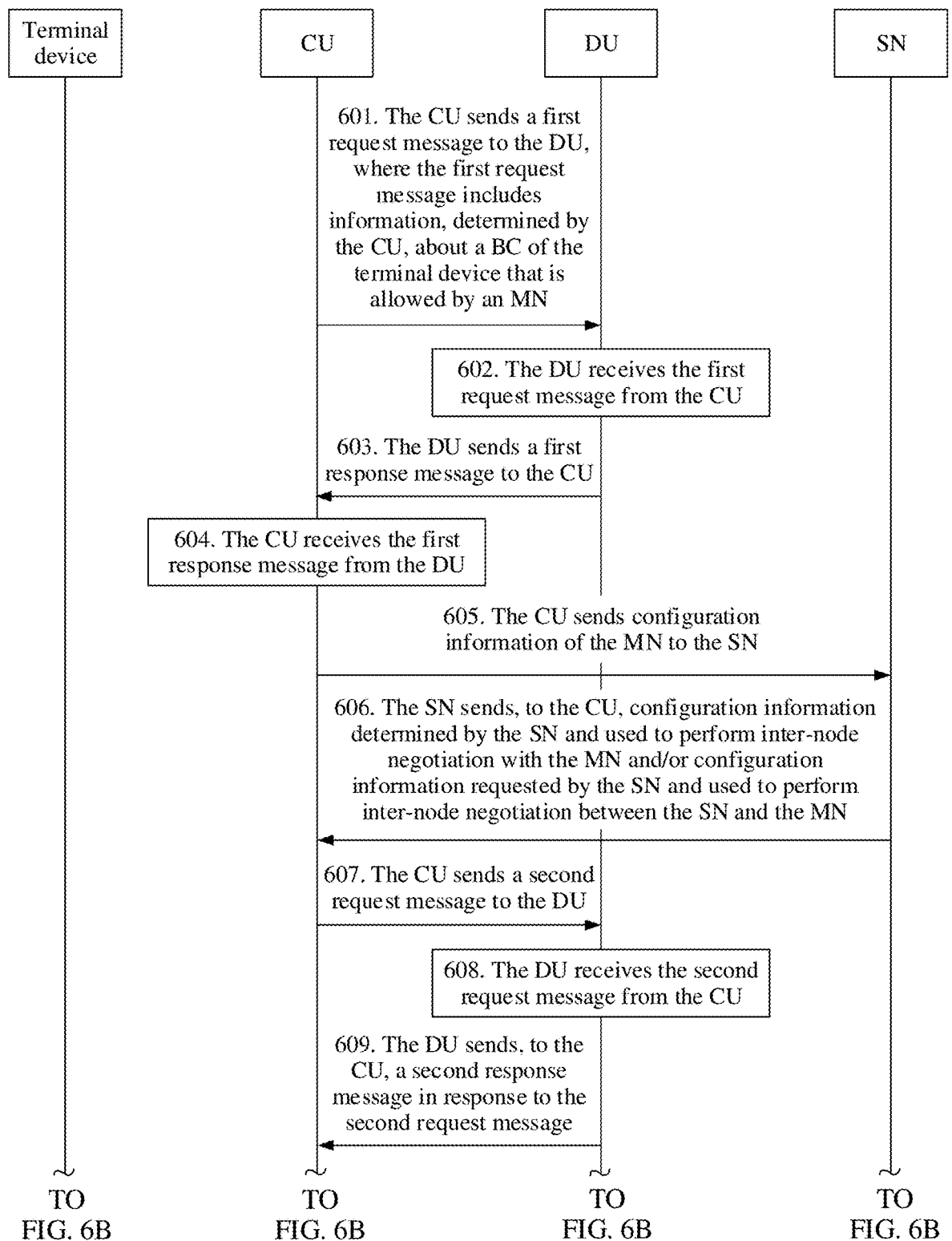
FIG. 6A and FIG. 6B are another schematic diagram of signal exchange applicable to a communication method according to an embodiment of this application.
Figure 6B:
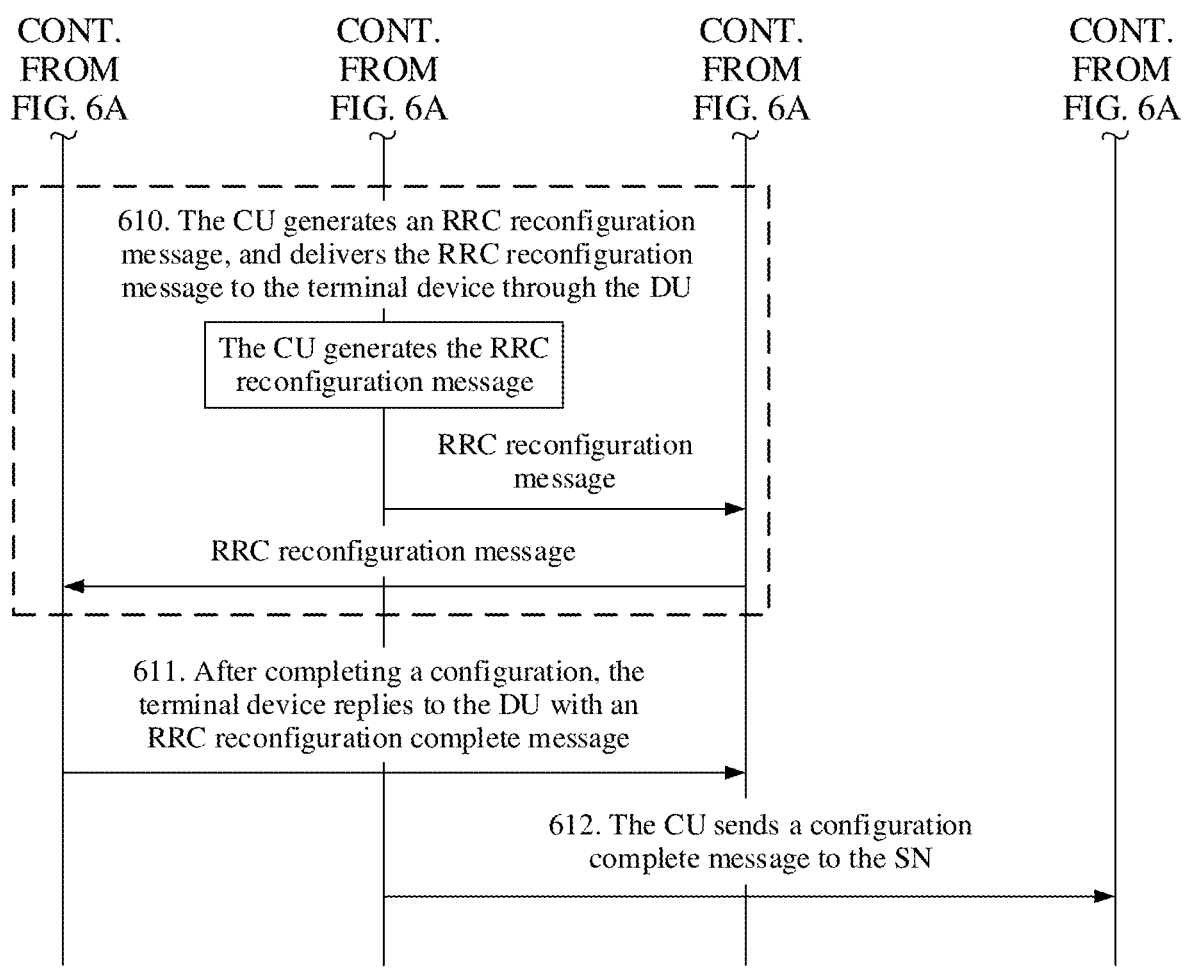

It should be noted that in step 503, the DU determines the information about the BC that is of the terminal device and allowed by the MN. Because the information about the BC of the terminal device is related to cell selection, and the cell selection is determined by the CU, the CU may determine the information about the BC that is of the terminal device and allowed by the MN, and then the DU determines, based on the information about the BC that is of the terminal device and allowed by the MN, the FS information corresponding to the information about the BC that is of the terminal device and allowed by the MN. In this way, in some embodiments, as shown in FIG. 6A and FIG. 6B, the foregoing steps 501 to 504 may be replaced with steps 601 to 604.

601. A CU sends a first request message to a DU, where the first request message includes information, determined by the CU, about a BC of a terminal device that is allowed by an MN.

In a possible design, the information, determined by the CU, about the BC of the terminal device that is allowed by the MN may be carried in another message different from the first request message. This is not limited in this application. The information about the BC allowed by the MN may be determined by the CU based on capability information reported by the terminal device. Specifically, the CU may determine, from information that is about a BC supported by the terminal device and that is reported by the terminal device, information about a BC allowed (supported) by the CU.

Optionally, the first request message may further include band information. Certainly, the band information may alternatively be carried in another message different from the first request message. This is not limited in this application.

For other related descriptions, refer to step 501. Details are not described herein again.

602. The DU receives the first request message from the CU.

The first request message includes the information, determined by the CU, about the BC that is allowed by the MN.

603. The DU sends a first response message to the CU, where the first response message includes configuration information of the MN.

The DU may determine the configuration information of the MN based on the first request message received from the CU, include the configuration information of the MN in the first response message, and send the first response message to the CU.

The configuration information of the MN may include one or more of the following information: a long DRX cycle start offset, a DRX slot offset, power headroom configuration information, FS information corresponding to the information about the BC that is of the terminal device and allowed by the MN, band information, a maximum reference quantity of PDCCH blind detections that is allowed to be configured by the SN, gap configuration information, a measurement gap configuration purpose, or high-frequency measurement gap configuration information.

The FS information corresponding to the information about the BC that is of the terminal device and allowed by the MN may be determined by the DU based on the information about the BC that is of the terminal device and allowed by the MN in the first request message. The FS information corresponding to the information about the BC that is of the terminal device and allowed by the MN may be an FS list, and each item in the FS list is a piece of FS indication information.

For other related descriptions, refer to the descriptions in step 503. Details are not described herein again.

604. The CU receives the first response message from the DU.

The CU receives the first response message from the DU, where the first response message includes the configuration information of the MN in step 603.

For step 605 to step 612, refer to step 505 to step 512. Details are not described herein again.

Based on the method provided in this embodiment of this application, when the MN uses a CU-DU architecture, the CU may send the first request message to the DU, to request the DU to generate the configuration information (lower layer configuration information in an inter-node message) of the MN. The configuration information of the MN is used to assist the SN in generating configuration information of the terminal device in a DC scenario. In this way, the CU can obtain the lower layer configuration information in the inter-node message from the DU, and then send the lower layer configuration information to the SN, for example, may send the lower layer configuration information to the SN by using a CG-ConfigInfo message, to complete an inter-node negotiation process between the MN and the SN. That is, the MN and the SN negotiate a capability of the terminal device based on corresponding configuration information, to implement DC configuration on the terminal device. The first request message may include the information, determined by the CU, about the BC that is allowed by the MN, and the DU may determine the corresponding FS information based on the information, determined by the CU, about the BC that is allowed by the MN.

Figure 7:
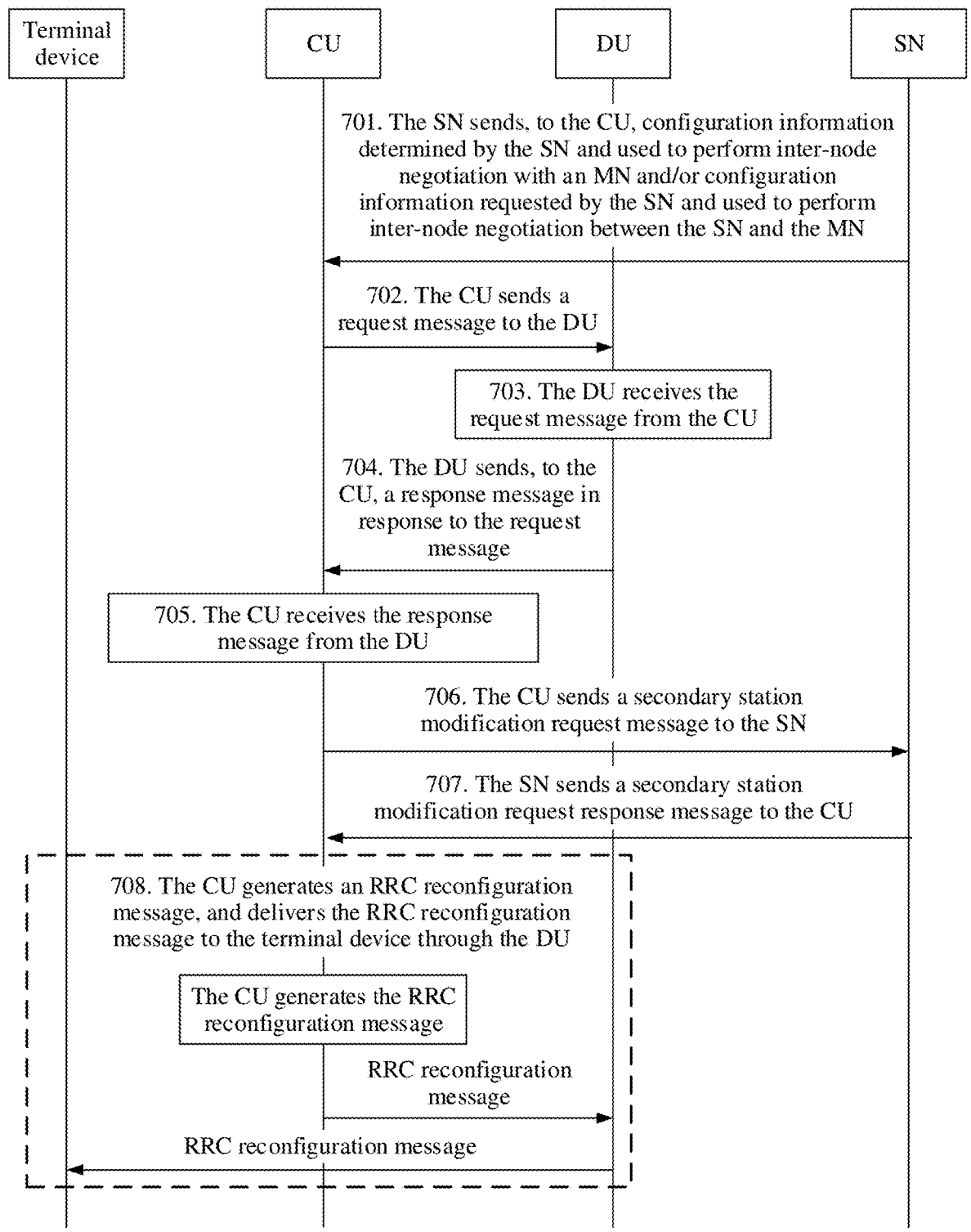
FIG. 7 is still another schematic diagram of signal exchange applicable to a communication method according to an embodiment of this application.

An embodiment of this application provides a communication method. An example in which an SN initiates an inter-node negotiation procedure (for example, a secondary station modification procedure) is used for description. As shown in FIG. 7, the method includes the following steps.

701. The SN sends, to a CU, configuration information determined by the SN and used to perform inter-node negotiation with an MN and/or configuration information requested by the SN and used to perform inter-node negotiation between the SN and the MN.

For example, the SN may send a secondary station modification required (required) message to the CU, the secondary station modification required message may include a CG-Config message, and the CG-Config message may include the configuration information determined by the SN and used to perform inter-node negotiation with the MN and/or the configuration information requested by the SN and used to perform inter-node negotiation between the SN and the MN.

It should be noted that, when the SN updates/modifies configuration information used to perform inter-node negotiation with the MN, the SN may notify the MN of the configuration information determined by the SN and used to perform inter-node negotiation with the MN. When the SN does not support or does not satisfy configuration information allowed by the MN, or when the MN does not configure corresponding configuration information, the SN may request the corresponding configuration information from the MN. Because the MN uses a CU-DU architecture, and the DU is responsible for a lower protocol layer, the DU may determine, based on a request of the SN, configuration information allowed by the DU and used to perform inter-node negotiation between the SN and the MN.

The configuration information determined by the SN and used to perform inter-node negotiation with the MN includes one or more of the following information: information about a BC selected by the SN, FS information corresponding to the information about the BC selected by the SN, a long DRX cycle start offset of the SN, a DRX slot offset of the SN, or power headroom configuration information of the SN. The information about the BC selected by the SN and the FS information corresponding to the information about the BC selected by the SN may be carried in a selected-BandCombination field in the CG-Config message. The long DRX cycle start offset of the SN may be carried in a drx-LongCycleStartOffset field. The DRX slot offset of the SN may be carried in a drx-SlotOffset field. The power headroom configuration information of the SN may be carried in a ph-InfoSCG field.

The configuration information requested by the SN, and used to perform inter-node negotiation between the SN and the MN may include one or more of the following information: information about a BC requested by the SN, FS information corresponding to the information about the BC requested by the SN, a quantity of PDCCH blind detections that is requested by the SN, or information for the SN to request to configure a gap. The information about the BC requested by the SN, and the FS information corresponding to the information about the BC requested by the SN may be carried in a requestedBC-MRDC field in the CG-Config message. The quantity of PDCCH blind detections that is requested by the SN may be carried in a requestedPDCCH-BlindDetectionSCG field. The information for the SN to request to configure a gap may be carried in a needForGaps field. When the MN does not provide the measurement gap information, the SN may request the MN to configure a measurement gap by using the information for the SN to request to configure a gap.

It should be noted that the CG-Config message may further include configuration information used for the terminal device. The SN may send the configuration information used for the terminal device to the CU by using the CG-Config message, and the CU transparently transmits the configuration information used for the terminal device to the terminal device through the DU, so that the terminal device performs DC communication based on the configuration information used for the terminal device. The configuration information used for the terminal device may be carried in an scg-CellGroupConfig field in the CG-Config message. Optionally, the configuration information used for the terminal device may alternatively be carried in an scg-RB-Config field.

702. The CU sends a request message to the DU, where the request message includes the configuration information determined by the SN and used to perform inter-node negotiation with the MN and/or the configuration information requested by the SN and used to perform inter-node negotiation between the SN and the MN.

After receiving the secondary station modification required message sent by the SN, the CU may obtain, from the secondary station modification required message, the configuration information determined by the SN and used to perform inter-node negotiation with the MN and/or the configuration information requested by the SN and used to perform inter-node negotiation between the SN and the MN, and send the configuration information to the DU by using the request message.

In some embodiments, the request message may be a terminal device context modification request message or a terminal device context setup request message. In some other embodiments, the request message may alternatively be another existing message or a newly introduced message. This is not limited in this application.

703. The DU receives the request message from the CU.

For the request message, refer to the related descriptions in step 702. Details are not described herein again.

704. The DU sends, to the CU, a response message in response to the request message.

When the request message includes the configuration information determined by the SN and used to perform inter-node negotiation with the MN, the response message is used to confirm that the DU has received the configuration information determined by the SN and used to perform inter-node negotiation with the MN. When the request message includes the configuration information requested by the SN and used to perform inter-node negotiation between the SN and the MN, the DU may determine the configuration information allowed by the DU and used to perform inter-node negotiation between the SN and the MN, and feed back the configuration information to the CU by using the response message, so that the CU feeds back, to the SN, the configuration information allowed by the DU and used to perform inter-node negotiation between the SN and the MN.

For example, for the information for the SN to request to configure a gap, the DU may reply with the measurement gap configuration information. For the information about the BC requested by the SN and the FS information corresponding to the information about the BC requested by the SN, the DU may reply with a response message to indicate confirmation, or may include other indication information in the response message to indicate confirmation. Alternatively, for the information about the BC requested by the SN and the FS information corresponding to the information about the BC requested by the SN, the DU may reply with information about the BC allowed by the DU and FS information corresponding to the information about the BC allowed by the DU. For example, assuming that the SN requests a BC 1 and an FS corresponding to the BC 1, if the DU allows the BC 1 and the FS corresponding to the BC 1, the DU may indicate the BC 1 and the FS corresponding to the BC 1 to the SN through the CU. For the quantity of PDCCH blind detections that is requested by the SN, the DU may feed back a quantity of PDCCH blind detections allowed by the DU. The quantity of PDCCH blind detections allowed by the DU may be greater than, less than, or equal to the quantity of PDCCH blind detections that is requested by the SN.

In addition, if the DU does not support the configuration information requested by the SN and used to perform inter-node negotiation with the MN (for example, the BC 1 and the FS corresponding to the BC 1 that are requested by the SN), the DU may send a terminal device context setup failure (UE context setup failure) message or a terminal device context modification failure (UE context modification failure) message to the CU to indicate negation or refusal, so that the CU notifies the SN that the request of the SN is refused.

In some embodiments, the response message may be a terminal device context modification request response message or a terminal device context setup request response message. In some other embodiments, the response message may alternatively be another existing message or a newly introduced response message. This is not limited in this application.

705. The CU receives the response message from the DU.

For the response message, refer to the related descriptions in step 704. Details are not described herein again.

In addition, if the CU determines that the DU supports the configuration information requested by the SN and used to perform inter-node negotiation with the MN, the CU may send a secondary station modification confirm (confirm) message to the SN. The secondary station modification confirm message is used to respond to the secondary station modification required message sent by the SN. If the CU determines that the DU does not support the configuration information requested by the SN and used to perform inter-node negotiation with the MN, the CU may send a secondary station modification refuse (refuse) message to the SN.

Optionally, when the measurement gap configuration information is involved, steps 706 and 707 may be further included.

706. The CU sends a secondary station modification request message to the SN.

The CU may send the measurement gap configuration information to the SN by using the secondary station modification request message. The measurement gap configuration information is determined by the DU.

707. The SN sends a secondary station modification request response message to the CU.

After completing configuration based on the measurement gap configuration information, the SN may send, to the CU, the secondary station modification request response message in response to the secondary station modification request message.

Optionally, steps 706 and 707 may not be performed. In step 705, the CU may send the measurement gap configuration information to the SN by using the secondary station modification confirm message.

Optionally, when configuration of the terminal device needs to be updated, step 708 may be further included.

708. The CU generates an RRC reconfiguration message, and delivers the RRC reconfiguration message to the terminal device through the DU.

For step 708, refer to the related descriptions in step 510. Details are not described herein again.

Based on the method provided in this embodiment of this application, the CU may receive, from the SN, lower layer configuration information such as the configuration information determined by the SN and used to perform inter-node negotiation with the MN and/or the configuration information requested by the SN and used to perform inter-node negotiation between the SN and the MN, and the CU may send the lower layer configuration information to the DU by using the request message. The DU may respond to the lower layer configuration information, and then the CU notifies the SN of a corresponding response result, to complete an inter-node negotiation process between the MN and the SN. This ensures that a secondary station modification procedure triggered by the SN is successfully completed.

In the foregoing embodiments provided in this application, the methods provided in embodiments of this application are separately described from perspectives of the CU, the DU, the SN, and interaction between the CU, the DU, and the SN. To implement functions in the methods provided in embodiments of this application, the CU, the DU, and the SN each may include a hardware structure and/or a software module, and implement the functions in a form of the hardware structure, the software module, or a combination of the hardware structure and the software module. Whether a specific function in the foregoing functions is performed by using the hardware structure, the software module, or the combination of the hardware structure and the software module depends on a specific application and a design constraint of the technical solutions.

Figure 8:
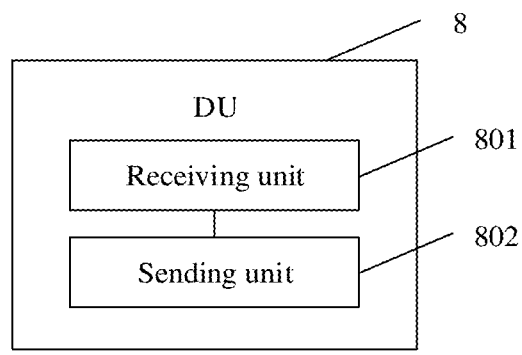
FIG. 8 is another schematic diagram of a structure of a DU according to an embodiment of this application.

When each function module is obtained through division based on each corresponding function, FIG. 8 is a possible schematic diagram of a structure of an apparatus 8 in the foregoing embodiments. The apparatus may be a DU, and includes a receiving unit 801 and a sending unit 802. In this embodiment of this application, the receiving unit 801 is configured to receive a first request message from a CU, where the first request message is used to request the DU to determine configuration information of an MN, and the configuration information of the MN is used to assist an SN in determining configuration information used for a terminal device. The sending unit 802 is configured to send a first response message to the CU, where the first response message includes the configuration information of the MN.

Alternatively, the receiving unit 801 is configured to receive a request message from a CU, where the request message includes configuration information determined by an SN and used to perform inter-node negotiation with an MN and/or configuration information requested by the SN and used to perform inter-node negotiation between the SN and the MN. The sending unit 802 is configured to send a response message in response to the request message to the CU.

In the method embodiments shown in FIG. 5A and FIG. 5B, FIG. 6A and FIG. 6B, and FIG. 7, the receiving unit 801 is configured to support the DU in performing, for example, the processes 502 and 508 in FIG. 5A and FIG. 5B, the processes 602 and 608 in FIG. 6A and FIG. 6B, and the process 703 in FIG. 7. The sending unit 802 is configured to support the DU in performing, for example, the processes 503 and 509 in FIG. 5A and FIG. 5B, the processes 603 and 609 in FIG. 6A and FIG. 6B, and the process 704 in FIG. 7. All related content of the steps in the foregoing method embodiments may be cited in function descriptions of corresponding function modules. Details are not described herein again.

Figure 9:
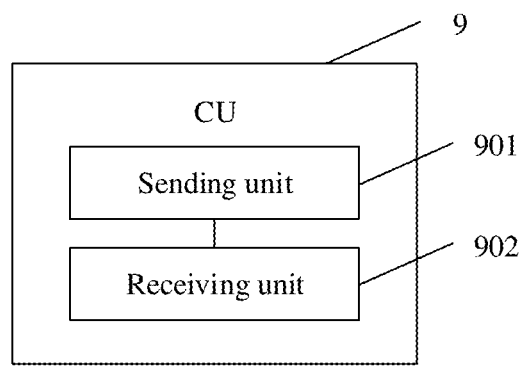
FIG. 9 is another schematic diagram of a structure of a CU according to an embodiment of this application.

When each function module is obtained through division based on each corresponding function, FIG. 9 is a possible schematic diagram of a structure of an apparatus 9 in the foregoing embodiments. The apparatus may be a CU, and includes a sending unit 901 and a receiving unit 902. In this embodiment of this application, the sending unit 901 is configured to send a first request message to a DU, where the first request message is used to request the DU to determine configuration information of an MN, and the configuration information of the MN is used to assist an SN in determining configuration information used for a terminal device. The receiving unit 902 is configured to receive a first response message from the DU, where the first response message includes the configuration information of the MN. The CU sends the configuration information of the MN to the SN.

Alternatively, the receiving unit 902 is configured to receive, from an SN, configuration information determined by the SN and used to perform inter-node negotiation with an MN and/or configuration information requested by the SN and used to perform inter-node negotiation between the SN and the MN. The sending unit 901 is configured to send a request message to a DU, where the request message includes the configuration information determined by the SN and used to perform inter-node negotiation with the MN and/or the configuration information requested by the SN and used to perform inter-node negotiation between the SN and the MN. The receiving unit 902 is further configured to receive, from the DU, a response message in response to the request message.

In the method embodiments shown in FIG. 5A and FIG. 5B, FIG. 6A and FIG. 6B, and FIG. 7, the sending unit 901 is configured to support the CU in performing, for example, the processes 501, 505, 507, and 512 in FIG. 5A and FIG. 5B, the processes 601, 605, 607, and 612 in FIG. 6A and FIG. 6B, and the processes 702 and 706 in FIG. 7. The receiving unit 902 is configured to support the CU in performing, for example, the process 504 in FIG. 5A and FIG. 5B, the process 604 in FIG. 6A and FIG. 6B, and the process 705 in FIG. 7. All related content of the steps in the foregoing method embodiments may be cited in function descriptions of corresponding function modules. Details are not described herein again.

Figure 10:
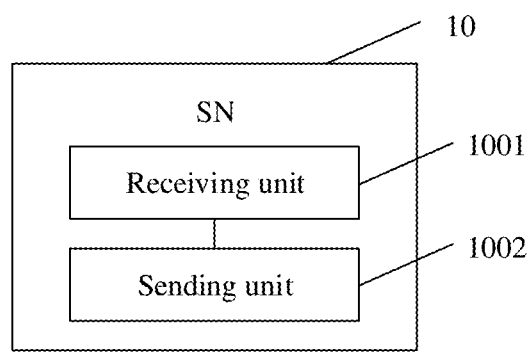
FIG. 10 is another schematic diagram of a structure of an SN according to an embodiment of this application.

When each function module is obtained through division based on each corresponding function, FIG. 10 is a possible schematic diagram of a structure of an apparatus 10 in the foregoing embodiments. The apparatus may be an SN, and includes a receiving unit 1001. In this embodiment of this application, the receiving unit 1001 is configured to receive power control mode indication information from an MN, where the power control mode indication information is used to negotiate a mode of sharing a power of a terminal device by the MN and the SN. Optionally, the SN may further include a sending unit 1002, configured to send, to the CU, configuration information determined by the SN and used to perform inter-node negotiation with the MN and/or configuration information requested by the SN and used to perform inter-node negotiation between the SN and the MN.

In the method embodiments shown in FIG. 5A and FIG. 5B, FIG. 6A and FIG. 6B, and FIG. 7, the sending unit 1002 is configured to support the SN in performing, for example, the process 506 in FIG. 5A and FIG. 5B, the process 606 in FIG. 6A and FIG. 6B, and the processes 701 and 707 in FIG. 7. All related content of the steps in the foregoing method embodiments may be cited in function descriptions of corresponding function modules. Details are not described herein again.

Division into modules in embodiments of this application is an example, and is merely logical function division. During actual implementation, there may be another division manner. In addition, functional modules in embodiments of this application may be integrated into one processor, or each of the modules may exist alone physically, or two or more modules are integrated into one module. The integrated module may be implemented in a form of hardware, or may be implemented in a form of a software functional module. For example, in embodiments of this application, the receiving unit and the sending unit may be integrated into a transceiver unit.

All or some of the methods in embodiments of this application may be implemented by using software, hardware, firmware, or any combination thereof. When software is used to implement embodiments, all or some of embodiments may be implemented in a form of a computer program product. The computer program product includes one or more computer instructions. When the computer program instructions are loaded and executed on a computer, the procedures or functions according to embodiments of the present invention are all or partially generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (digital video disc, DVD)), a semiconductor medium (for example, a solid state drive (solid state drive, SSD)), or the like.

It is clear that a person skilled in the art can make various modifications and variations to embodiments of this application without departing from the scope of this application. In this way, this application is intended to cover these modifications and variations of embodiments of this application provided that they fall within the scope of the claims of this application and their equivalent technologies.

What is claimed is:

1. A communication method, comprising:
   receiving, by a distributed unit (DU), a first request message from a centralized unit (CU), wherein the first request message is useable to request the DU to determine configuration information of a master node (MN), and the configuration information of the MN is useable to assist a secondary node (SN) in determining configuration information useable for a terminal device; and
   sending, by the DU, a first response message to the CU, wherein the first response message comprises the configuration information of the MN.

2. The communication method according to claim 1, wherein the configuration information of the MN comprises one or more of:
   a long discontinuous reception (DRX) cycle start offset, a DRX slot offset, power headroom configuration information, band combination (BC) information of the terminal device and allowed by the MN, feature set (FS) information corresponding to the BC information of the terminal device and allowed by the MN, band information, a maximum reference quantity of physical downlink control channel (PDCCH) blind detections allowed to be configured by the SN, measurement gap configuration information, a measurement gap configuration purpose, or high-frequency measurement gap configuration information.

3. The communication method according to claim 1, wherein the first request message comprises indication information, and the indication information indicates for the DU to determine the configuration information of the MN.

4. The communication method according to claim 1, wherein the first request message comprises band combination (BC) information of the terminal device and allowed by the MN.

5. The communication method according to claim 4, wherein the method further comprises:
   determining, by the DU based on the BC information of the terminal device and allowed by the MN, feature set (FS) information corresponding to the BC information of the terminal device and allowed by the MN.

6. The communication method according to claim 1, wherein the method further comprises:
   receiving, by the DU, a second request message from the CU, wherein the second request message comprises configuration information determined by the SN and useable to perform inter-node negotiation with the MN; and
   sending, by the DU to the CU, a second response message in response to the second request message.

7. The communication method according to claim 6, wherein the configuration information determined by the SN and useable to perform inter-node negotiation with the MN comprises one or more of:
   band combination (BC) information selected by the SN, feature set (FS) information corresponding to the BC information selected by the SN, a long discontinuous reception (DRX) cycle start offset of the SN, a DRX slot offset of the SN, or power headroom configuration information of the SN.

8. The communication method according to claim 6, wherein
   the second request message further comprises configuration information requested by the SN and useable to perform inter-node negotiation between the SN and the MN, and the method further comprises:

determining, by the DU based on the configuration information requested by the SN and useable to perform inter-node negotiation between the SN and the MN, configuration information allowed by the DU and useable to perform inter-node negotiation between the SN and the MN, wherein the second response message comprises the configuration information allowed by the DU and useable to perform inter-node negotiation between the SN and the MN.

9. The communication method according to claim 8, wherein the configuration information requested by the SN and useable to perform inter-node negotiation between the SN and the MN comprises one or more of:

BC information requested by the SN, FS information corresponding to the BC information requested by the SN, a quantity of physical downlink control channel (PDCCH) blind detections requested by the SN, or information for the SN to request to configure a measurement gap.

10. A communication method, comprising:

sending, by a centralized unit (CU), a first request message to a distributed unit (DU), wherein the first request message requests the DU to determine configuration information of a master node (MN), and the configuration information of the MN is useable to assist a secondary node (SN) in determining configuration information useable for a terminal device;

receiving, by the CU, a first response message from the DU, wherein the first response message comprises the configuration information of the MN; and sending, by the CU, the configuration information of the MN to the SN.

11. The communication method according to claim 10, wherein the configuration information of the MN comprises one or more of:

a long discontinuous reception (DRX) cycle start offset, a DRX slot offset, power headroom configuration information, band combination (BC) information of the terminal device and allowed by the MN, feature set (FS) information corresponding to the BC information of the terminal device and allowed by the MN, band information, a maximum reference quantity of physical downlink control channel (PDCCH) blind detections allowed to be configured by the SN, measurement gap configuration information, a measurement gap configuration purpose, or high-frequency measurement gap configuration information.

12. The communication method according to claim 10, wherein the method further comprises:

determining, by the CU, power control mode indication information, wherein the power control mode indication information is useable to negotiate a mode of sharing a power of the terminal device by the MN and the SN; and sending, by the CU, the power control mode indication information to the SN.

13. A communications apparatus, comprising a processor and a non-transitory memory coupled to the processor, wherein the non-transitory memory is configured to store non-transitory instructions; and in response to being executed by the processor, the non-transitory instructions cause the communication apparatus to perform operations comprising:

receiving a first request message from a centralized unit (CU), wherein the first request message is useable to request a distributed unit (DU) to determine configuration information of a master node (MN), and the configuration information of the MN is useable to assist a secondary node (SN) in determining configuration information useable for a terminal device; and sending a first response message to the CU, wherein the first response message comprises the configuration information of the MN.

14. The communications apparatus according to claim 13, wherein the configuration information of the MN comprises one or more of:

a long discontinuous reception (DRX) cycle start offset, a DRX slot offset, power headroom configuration information, band combination (BC) information of the terminal device and allowed by the MN, feature set (FS) information corresponding to the BC information of the terminal device and allowed by the MN, band information, a maximum reference quantity of physical downlink control channel (PDCCH) blind detections allowed to be configured by the SN, measurement gap configuration information, a measurement gap configuration purpose, or high-frequency measurement gap configuration information.

15. The communications apparatus according to claim 13, wherein the first request message comprises indication information, and the indication information indicates for the DU to determine the configuration information of the MN.

16. The communications apparatus according to claim 13, wherein the first request message comprises band combination (BC) information of the terminal device and allowed by the MN.

17. The communications apparatus according to claim 16, wherein the non-transitory instructions further cause the communications apparatus to perform operations comprising:

determining, based on the BC information of the terminal device and allowed by the MN, feature set (FS) information corresponding to the BC information of the terminal device and allowed by the MN.

18. The communications apparatus according to claim 13, wherein the non-transitory instructions further cause the communications apparatus to perform operations comprising:

receiving a second request message from the CU, wherein the second request message comprises configuration information determined by the SN and useable to perform inter-node negotiation with the MN; and sending, to the CU, a second response message in response to the second request message.

19. The communications apparatus according to claim 18, wherein the configuration information determined by the SN and useable to perform inter-node negotiation with the MN comprises one or more of:

band combination (BC) information selected by the SN, feature set (FS) information corresponding to the BC information selected by the SN, a long discontinuous reception (DRX) cycle start offset of the SN, a DRX slot offset of the SN, or power headroom configuration information of the SN.

20. The communications apparatus according to claim 18, wherein the second request message further comprises configuration information requested by the SN and useable to perform inter-node negotiation between the SN and the MN, and the non-transitory instructions further cause the communications apparatus to perform operations comprising:

determining, based on the configuration information requested by the SN and useable to perform inter-node negotiation between the SN and the MN, configuration information allowed by the DU and useable to perform inter-node negotiation between the SN and the MN, wherein the second response message comprises the configuration information allowed by the DU and useable to perform inter-node negotiation between the SN and the MN.

* * * * *

UNITED STATES PATENT AND TRADEMARK OFFICE
CERTIFICATE OF CORRECTION

| | | |
|---|---|---|
| PATENT NO. | : 12,289,789 B2 | Page 1 of 1 |
| APPLICATION NO. | : 17/879037 | |
| DATED | : April 29, 2025 | |
| INVENTOR(S) | : Wenjie Peng et al. | |

It is certified that error appears in the above-identified patent and that said Letters Patent is hereby corrected as shown below:

On the Title Page

Item (57), should read as follows:
A communication method includes receiving, by a distributed unit (DU), a first request message from a centralized unit (CU). The first request message is useable to request the DU to determine configuration information of a master node (MN). The configuration information of the MN is useable to assist a secondary node (SN) in determining configuration information useable for a terminal device. The method further includes sending, by the DU, a first response message to the CU. The first response message includes the configuration information of the MN.

Signed and Sealed this
Third Day of June, 2025

Coke Morgan Stewart
*Acting Director of the United States Patent and Trademark Office*